(12) United States Patent
Shum

(10) Patent No.: US 7,424,029 B1
(45) Date of Patent: Sep. 9, 2008

(54) STOCHASTIC UNIFIED MULTIPLE ACCESS TO A COMMUNICATIONS CHANNEL

(75) Inventor: Allen Shum, San Diego, CA (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 1335 days.

(21) Appl. No.: 10/449,578

(22) Filed: May 30, 2003

(51) Int. Cl.
*H04L 12/413* (2006.01)
(52) U.S. Cl. ...................................... 370/445
(58) Field of Classification Search .......... 370/445–463
See application file for complete search history.

(56) References Cited

U.S. PATENT DOCUMENTS

| | | | | |
|---|---|---|---|---|
| 5,448,768 A | * | 9/1995 | Zinser | 455/108 |
| 5,509,086 A | * | 4/1996 | Edgar et al. | 382/167 |
| 6,374,099 B1 | * | 4/2002 | Bi et al. | 455/404.1 |
| 6,418,136 B1 | * | 7/2002 | Naor et al. | 370/347 |

OTHER PUBLICATIONS

"Development of ALOHANET," N. Abramson., IEEE Transactions on Information Theory, vol. IT-31, pp. 119-123, Mar. 1985.
"Ethernet: Distributed packet switching for local computer networks," R. M. Metcalf et al., Communications of the Association of Computing Machinery, vol. 19, pp. 395-404, Jul. 1976.

* cited by examiner

*Primary Examiner*—Huy D. Vu
*Assistant Examiner*—Alex Skripnikov
(74) *Attorney, Agent, or Firm*—Peter A. Lipovsky; J. Eric Anderson; Ryan J. Friedl

(57) ABSTRACT

In an example of the method aspect of the invention, a first user detects transmissions from a first group of users over a multiple access communications channel. The number of users in the first group of users are counted, and the value of a variable N is set equal to the number counted plus one. The method further includes determining whether the first user has data to transmit during a first time slot, and if so, the method also includes generating a first random number, calculating 1/N, and determining if the first random number is less than 1/N. If it is determined that the first random number is less than 1/N, then a signal is transmitted from the first user during the first time slot.

32 Claims, 26 Drawing Sheets

FIG. 15
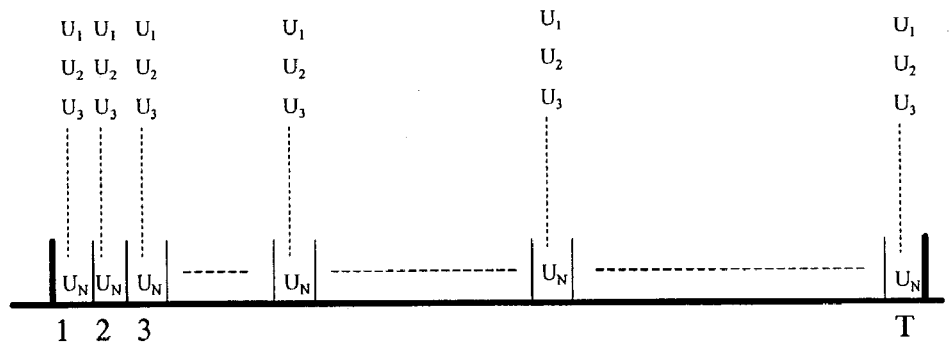
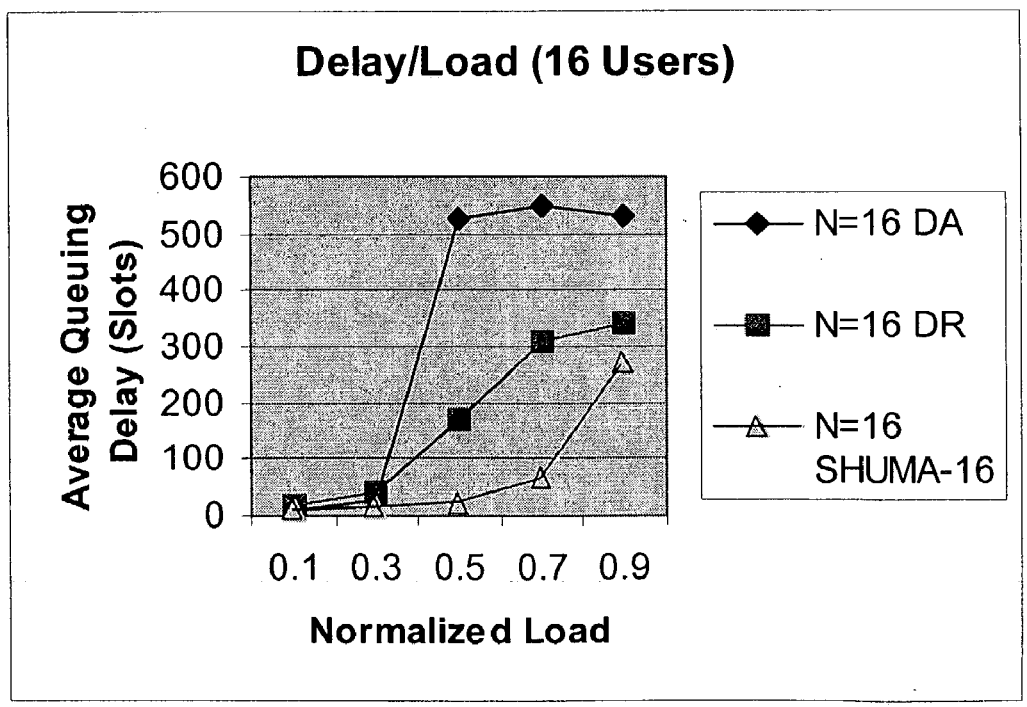
FIG. 16A

FIG. 21A

| Pr(a,b) | b | | | | | | |
|---|---|---|---|---|---|---|---|
| a | 0 | 0.05 | 0.1 | 0.15 | 0.2 | 0.25 | 0.3 |
| 0 | 1 | 1 | 1 | 1 | 1 | 1 | 1 |
| 0.05 | 1 | 0.997503 | 0.995012 | 0.992528 | 0.99005 | 0.987578 | 0.985112 |
| 0.1 | 1 | 0.995012 | 0.99005 | 0.985112 | 0.980199 | 0.97531 | 0.970446 |
| 0.15 | 1 | 0.992528 | 0.985112 | 0.977751 | 0.970446 | 0.963194 | 0.955997 |
| 0.2 | 1 | 0.99005 | 0.980199 | 0.970446 | 0.960789 | 0.951229 | 0.941765 |
| 0.25 | 1 | 0.987578 | 0.97531 | 0.963194 | 0.951229 | 0.939413 | 0.927743 |
| 0.3 | 1 | 0.985112 | 0.970446 | 0.955997 | 0.941765 | 0.927743 | 0.913931 |
| 0.35 | 1 | 0.982652 | 0.965605 | 0.948854 | 0.932394 | 0.916219 | 0.900325 |
| 0.4 | 1 | 0.980199 | 0.960789 | 0.941765 | 0.923116 | 0.904837 | 0.88692 |
| 0.45 | 1 | 0.977751 | 0.955997 | 0.934728 | 0.913931 | 0.893597 | 0.873716 |
| 0.5 | 1 | 0.97531 | 0.951229 | 0.927743 | 0.904837 | 0.882497 | 0.860708 |
| 0.55 | 1 | 0.972875 | 0.946485 | 0.920811 | 0.895834 | 0.871534 | 0.847894 |
| 0.6 | 1 | 0.970446 | 0.941765 | 0.913931 | 0.88692 | 0.860708 | 0.83527 |
| 0.65 | 1 | 0.968022 | 0.937067 | 0.907102 | 0.878095 | 0.850016 | 0.822835 |
| 0.7 | 1 | 0.965605 | 0.932394 | 0.900325 | 0.869358 | 0.839457 | 0.810584 |
| 0.75 | 1 | 0.963194 | 0.927743 | 0.893597 | 0.860708 | 0.829029 | 0.798516 |
| 0.8 | 1 | 0.960789 | 0.923116 | 0.88692 | 0.852144 | 0.818731 | 0.786628 |
| 0.85 | 1 | 0.95839 | 0.918512 | 0.880293 | 0.843665 | 0.80856 | 0.774916 |
| 0.9 | 1 | 0.955997 | 0.913931 | 0.873716 | 0.83527 | 0.798516 | 0.763379 |
| 0.95 | 1 | 0.95361 | 0.909373 | 0.867188 | 0.826959 | 0.788597 | 0.752014 |
| 1 | 1 | 0.951229 | 0.904837 | 0.860708 | 0.818731 | 0.778801 | 0.740818 |

FIG. 21B

| 0.35 | 0.4 | 0.45 | 0.5 | 0.55 | 0.6 | 0.65 |
|---|---|---|---|---|---|---|
| 1 | 1 | 1 | 1 | 1 | 1 | 1 |
| 0.982652 | 0.980199 | 0.977751 | 0.975311 | 0.972875 | 0.970446 | 0.968022 |
| 0.965605 | 0.960789 | 0.955997 | 0.951229 | 0.946485 | 0.941765 | 0.937067 |
| 0.948854 | 0.941765 | 0.934728 | 0.927743 | 0.920811 | 0.913931 | 0.907102 |
| 0.932394 | 0.923116 | 0.913931 | 0.904837 | 0.895834 | 0.88692 | 0.878095 |
| 0.916219 | 0.904837 | 0.893597 | 0.882497 | 0.871534 | 0.860708 | 0.850016 |
| 0.900325 | 0.88692 | 0.873716 | 0.860708 | 0.847894 | 0.83527 | 0.822835 |
| 0.884706 | 0.869358 | 0.854277 | 0.839457 | 0.824894 | 0.810584 | 0.796522 |
| 0.869358 | 0.852144 | 0.83527 | 0.818731 | 0.802519 | 0.786628 | 0.771052 |
| 0.854277 | 0.83527 | 0.816686 | 0.798516 | 0.78075 | 0.763379 | 0.746395 |
| 0.839457 | 0.818731 | 0.798516 | 0.778801 | 0.759572 | 0.740818 | 0.722527 |
| 0.824894 | 0.802519 | 0.78075 | 0.759572 | 0.738968 | 0.718924 | 0.699423 |
| 0.810584 | 0.786628 | 0.763379 | 0.740818 | 0.718924 | 0.697676 | 0.677057 |
| 0.796522 | 0.771052 | 0.746395 | 0.722527 | 0.699423 | 0.677057 | 0.655406 |
| 0.782705 | 0.755784 | 0.729789 | 0.704688 | 0.680451 | 0.657047 | 0.634448 |
| 0.769126 | 0.740818 | 0.713552 | 0.687289 | 0.661993 | 0.637628 | 0.61416 |
| 0.755784 | 0.726149 | 0.697676 | 0.67032 | 0.644036 | 0.618783 | 0.594521 |
| 0.742673 | 0.71177 | 0.682154 | 0.65377 | 0.626567 | 0.600496 | 0.575509 |
| 0.729789 | 0.697676 | 0.666977 | 0.637628 | 0.609571 | 0.582748 | 0.557106 |
| 0.717129 | 0.683861 | 0.652137 | 0.621885 | 0.593036 | 0.565525 | 0.539291 |
| 0.704688 | 0.67032 | 0.637628 | 0.606531 | 0.57695 | 0.548812 | 0.522046 |

FIG. 21C

| 0.7 | 0.75 | 0.8 | 0.85 | 0.9 | 0.95 | 1 |
|---|---|---|---|---|---|---|
| 1 | 1 | 1 | 1 | 1 | 1 | 1 |
| 0.965605 | 0.963194 | 0.960789 | 0.95839 | 0.955997 | 0.95361 | 0.951229 |
| 0.932394 | 0.927743 | 0.923116 | 0.918512 | 0.913931 | 0.909373 | 0.904837 |
| 0.900325 | 0.893597 | 0.88692 | 0.880293 | 0.873716 | 0.867188 | 0.860708 |
| 0.869358 | 0.860708 | 0.852144 | 0.843665 | 0.83527 | 0.826959 | 0.818731 |
| 0.839457 | 0.829029 | 0.818731 | 0.80856 | 0.798516 | 0.788597 | 0.778801 |
| 0.810584 | 0.798516 | 0.786628 | 0.774916 | 0.763379 | 0.752014 | 0.740818 |
| 0.782705 | 0.769126 | 0.755784 | 0.742673 | 0.729789 | 0.717129 | 0.704688 |
| 0.755784 | 0.740818 | 0.726149 | 0.71177 | 0.697676 | 0.683861 | 0.67032 |
| 0.729789 | 0.713552 | 0.697676 | 0.682154 | 0.666977 | 0.652137 | 0.637628 |
| 0.704688 | 0.687289 | 0.67032 | 0.65377 | 0.637628 | 0.621885 | 0.606531 |
| 0.680451 | 0.661993 | 0.644036 | 0.626567 | 0.609571 | 0.593036 | 0.57695 |
| 0.657047 | 0.637628 | 0.618783 | 0.600496 | 0.582748 | 0.565525 | 0.548812 |
| 0.634448 | 0.61416 | 0.594521 | 0.575509 | 0.557106 | 0.539291 | 0.522046 |
| 0.612626 | 0.591555 | 0.571209 | 0.551563 | 0.532592 | 0.514274 | 0.496585 |
| 0.591555 | 0.569783 | 0.548812 | 0.528612 | 0.509156 | 0.490417 | 0.472367 |
| 0.571209 | 0.548812 | 0.527292 | 0.506617 | 0.486752 | 0.467666 | 0.449329 |
| 0.551563 | 0.528612 | 0.506617 | 0.485537 | 0.465334 | 0.445972 | 0.427415 |
| 0.532592 | 0.509156 | 0.486752 | 0.465334 | 0.444858 | 0.425283 | 0.40657 |
| 0.514274 | 0.490417 | 0.467666 | 0.445972 | 0.425283 | 0.405555 | 0.386741 |
| 0.496585 | 0.472367 | 0.449329 | 0.427415 | 0.40657 | 0.386741 | 0.367879 |

STOCHASTIC UNIFIED MULTIPLE ACCESS TO A COMMUNICATIONS CHANNEL

BACKGROUND

1. Field of the Invention

The present invention relates to minimizing simultaneous transmissions and efficiently utilizing a multiple access communications channel. More particularly, the invention concerns determining whether a user should transmit a signal over a multiple access communications channel during a particular time slot.

2. Description of Related Art

In many applications communications channels are shared by multiple users. Use of a communications channel by multiple users must be coordinated to prevent excessive interference between users' transmissions. Various methods, such as Time Division Multiple Access (TDMA), Frequency Division Multiple Access (FDMA), and Code Division Multiple Access (CDMA), have been devised to permit multiple users to share a communications channel. TDMA is used in many applications.

With TDMA, a communications channel is shared by defining time slots, and permitting preferably only one user to transmit during any particular time slot. Generally, it is desirable to permit each user to transmit their messages with minimal delay from the time that they have a message to transmit. It is also desirable to minimize collisions that result from simultaneous transmissions from multiple users onto the same channel, because the simultaneously transmitted signals can become garbled and difficult or impossible to receive.

Protocols referred to as multiple access protocols have been devised to arbitrate the use of broadcast channels by multiple users. Dynamic Reservation protocols are an example of a type of multiple access protocol that can be used with TDMA systems. Generally, with a Dynamic Reservation protocol, users transmit channel access requests, which must be coordinated and resolved before a user can transmit a data message. Coordinating and resolving the channel access requests also generally requires transmitting over the channel. Thus, bandwidth is undesirably utilized by the channel access request messages and the messages for resolving channel access requests. Additionally, there can be simultaneous transmissions of channel access requests and messages for resolving access requests. Furthermore, Dynamic Reservation protocols inherently have a delay of a number of cycle times before a message can be transmitted, due to the time required to transmit channel access requests and to coordinate and resolve requests, and the cycle time increases as the number of units increases. Consequently, Dynamic Reservation protocols have disadvantages for many applications.

The Dedicated Access protocol is an example of another TDMA multiple access protocol. The Dedicated Access protocol has been used with Link-16, which is a frequency hopping spread spectrum communications protocol, and which is the primary tactical data link used by the U.S. Department of Defense. Link-16 uses TDMA frames, wherein each frame has 1,536 slots/12 seconds=7.8125 ms/slot. With the Dedicated Access protocol, each user is assigned a fixed set of transmission time slots during which the user may transmit messages. Each user may be allocated the same number of time slots in a frame, or if desired, different numbers of time slots in a frame may be allocated to different users. FIG. 1 shows a representation of a Dedicated Access protocol, in which each user is assigned one time slot. With Dedicated Access, simultaneous transmissions do not occur between users' transmissions because each time slot is assigned to a single user, and because each user can transmit only during their assigned time slots. However, Dedicated Access has a number of disadvantages.

A significant shortcoming of Dedicated Access is that, before the communications channel can be used by a group of users, time slots must be assigned to the users. A network design phase, which typically takes several weeks even for a small number of users, is required to determine the time slot assignments. This long delay is undesirable, and is particularly unsatisfactory during crisis situations. Also, a user's time slot assignments cannot be changed without conducting another network design phase. Another deficiency of Dedicated Access is that users cannot be added or removed from the communications network, because new time slot assignments must be produced in a new network design phase before users can be added or removed.

Additionally, because time slots cannot be reassigned in the Dedicated Access protocol, if one or more users are not present while the communications channel is being used, the time slots assigned to the absent users will not be used and channel capacity will be wasted. As an example, the group of users to which time slots are assigned may include a number of aircraft and ships (which may be called platforms). If one or more of the aircraft or ships are not present, the time slots assigned to those aircraft or ships will be wasted.

Dedicated Access is also inefficient because the number of time slots allocated to users is fixed, whereas the transmission needs of users typically fluctuate randomly. Users' transmission needs typically fluctuate depending on random events, for example events that occur on a battlefield. Consequently, many times the fixed number of time slots allocated to a user with the Dedicated Access protocol are insufficient for the user to disseminate the user's messages quickly, resulting in poor performance. At other times, one or more users may have time slots that they are not using because they do not have a message to transmit. With the Dedicated Access protocol the time slots that are assigned to a user cannot be used by other users, and consequently time slots that are not used by their assigned users remain unused and channel capacity is wasted.

With Dedicated Access, the total number of time slots assigned to users may be increased when the number of users increases, and consequently, the cycle time, which is the sum of all of the time slots, will also increase. Consequently, the waiting time that each user must wait before being able to transmit a message increases. Additionally, when there are a large number of users, the number of time slots assigned to any particular user may decrease, making it more likely that a user will require additional cycle times to complete transmission of a message.

In summary, Dedicated Access is unsatisfactory in many applications because it requires a long network design phase, it cannot support the unplanned entries and exits of users without incurring another network design phase, it cannot efficiently accommodate the fluctuating transmission needs of users, and because it cannot scale to support a large number of users efficiently. Consequently, known protocols for arbitrating multiple users' accesses to many types of communications channels can be improved upon.

SUMMARY

One aspect of the invention is a method for determining whether to transmit a signal during a time slot. An example of the method includes detecting transmissions from a first group of users, wherein the transmissions are detected by a first designated user. The method also includes determining a first count of the number of users in the first group of users, and setting the value of a variable $N_{1,1}$ equal to one plus the first count. The variable $N_{1,1}$ represents the number of users sharing the communications channel during the first time slot, as determined from the perspective of the first designated user. The method further includes determining whether the first designated user has data to transmit during a first time slot. If it is determined that the first designated user has data to transmit during the first time slot, then the method also includes generating a first random number $R_1 (0 \leq R_1 \leq 1)$, calculating $1/N_{1,1}$, and determining if the first random number is less than $1/N_{1,1}$. If it is determined that the first random number is less than $1/N_{1,1}$, then the method also includes transmitting a first time slot signal from the first designated user during the first time slot.

Other aspects of the invention are described in the sections below, and include, for example, a transceiver, and a signal bearing medium tangibly embodying a program of machine-readable instructions executable by a digital processing apparatus to perform a method for determining whether to transmit a signal during a time slot.

The invention accomplishes a number of objects, which provide numerous advantages. For example, the invention provides a simple multiple access protocol with simplified preplanning, wherein capacity is allocated on a group basis without time consuming pre-usage network design on a per platform basis. The invention also provides the benefits of spatial reuse by adaptively accommodating unplanned dynamic entries and exits of users in real time. The invention beneficially allocates channel capacity only to the users that are present in a particular local at a particular time, and no capacity is wasted on users that are not present. The invention also efficiently accommodates users' fluctuating transmission needs and provides fair, statistical sharing of a channel regardless of the stochastic nature of users' traffic. The invention further permits low latency, quick user access to a channel without cycle-time limitations, even when the number of users is extremely large, and wherein the time between successive channel accesses by a user may be as small as one time slot. Additionally, the invention beneficially permits users to statistically share channel capacity so that users with the greatest transmission needs obtain a greater share of the capacity, which results in higher efficiency and smaller message delays. Further, the invention is scalable and can efficiently support a large number of users at high throughput levels. The invention also advantageously provides low computational complexity, which does not increase as the number of users increases. The invention also provides the additional advantages of being distributed in the units using the channel, and operating without a central unit, and functioning independently of the network topology. The invention also easily accommodates real time changes in network topology as the positions of users change over a large geographic area. Additionally, the invention minimizes simultaneous transmissions by maximizing the probability of having only one transmitter during each time slot, and provides an expected number of one transmitter for each time slot. The invention also provides the benefit of not using any overhead messages over the channel. Further, the invention provides consistent and robust communications capability with reduced susceptibility to noise, jamming, and other errors, even after the failure of units in the network. The invention also provides a number of other advantages and benefits, which should be apparent from the following description.

BRIEF DESCRIPTION OF THE DRAWINGS

FIG. 15 is an illustration of a cycle with N users in accordance with an exemplary embodiment of the invention.

FIGS. 16A-C are graphs showing queuing delays for Dedicated Access, Dynamic Reservation, and for an exemplary embodiment of the invention, when N=16, 64, and 256.

FIGS. 21A-C are a chart showing the conditional probability that a Unit i will receive a message, in accordance with an exemplary embodiment of the invention.

DETAILED DESCRIPTION

Figure 1:
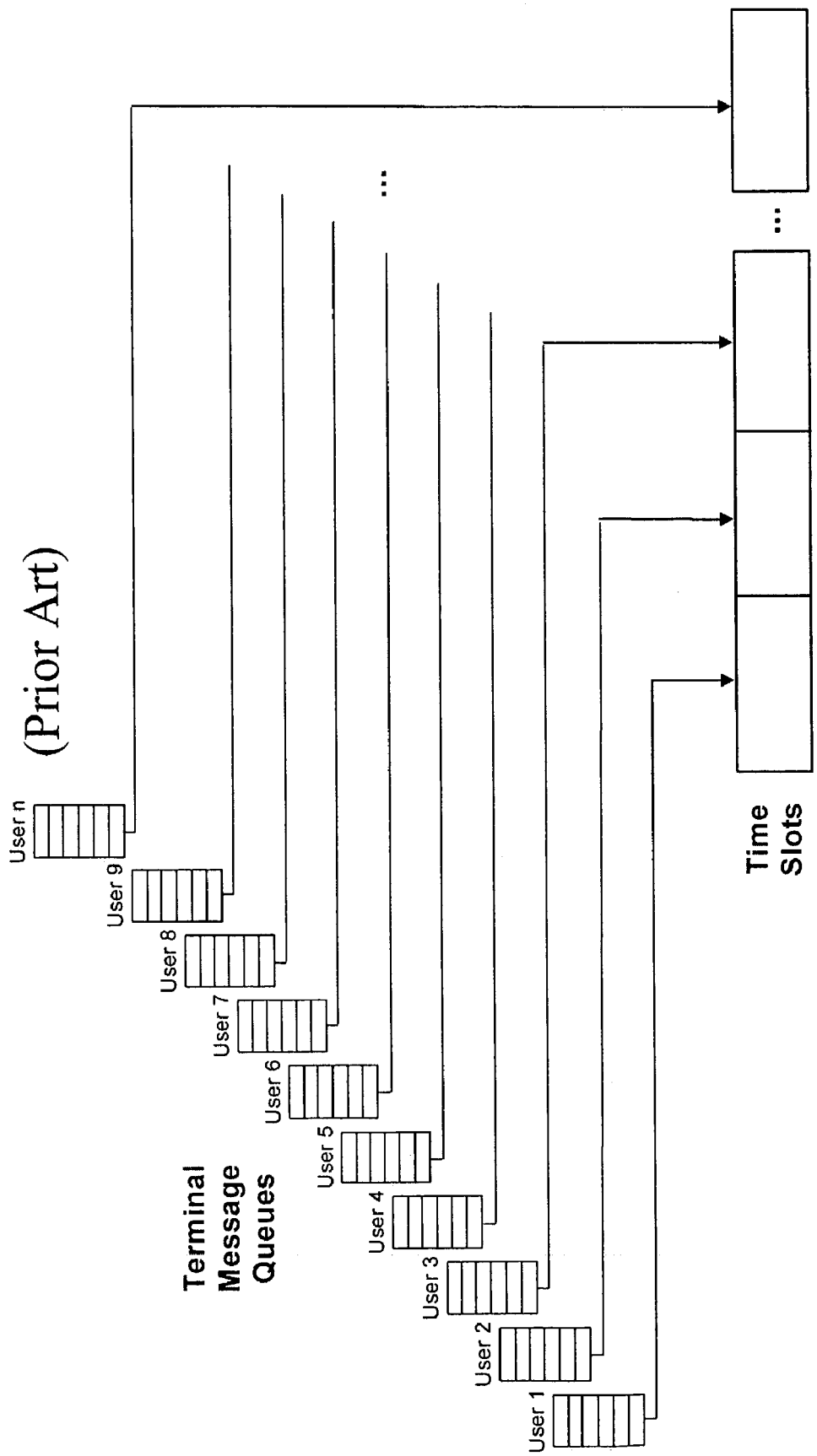
FIG. 1 is a depiction of a dedicated access multiple access communication system in accordance with the prior art.

The nature, objectives, and advantages of the invention will become more apparent to those skilled in the art after considering the following detailed description in connection with the accompanying drawings. The invention may also be referred to as the Stochastic Unified Multiple Access (SHUMA) protocol.

I. OVERVIEW

An illustrative example of the invention is a distributed multiple access protocol that is simple, robust, and scalable.

This example of the invention may support dynamic entries and exits, and may operate independently of the network topology. This example of the invention also supports the fair, statistical sharing of a channel by the users regardless of the stochastic nature of users' traffic. Aspects of the invention complement the inherent limitations of communications protocols such as Link-16, including the error-prone RF channel, capture, high user mobility, line-of-sight RF communication, and the large geographical area. This example of the invention generalizes the concept of Dedicated Access, wherein instead of allowing one user to have exclusive access of the ith slot of a TDMA frame of length T, $N_i$ users statistically share the time slot, where $1 \leq i \leq T$ and $1 \leq N_i$. The sharing is done while keeping the expected number of transmitters at 1 and maximizing the probability of having one transmitter. Although simultaneous transmissions are possible, the frequency with which they occur is minimized. For example, in the theoretical case where there are an infinite number of saturated users, the frequency that a transmission is interfered with by j other transmissions decreases hyperexponentially as j increases from 0. In some embodiments, the negative effects of simultaneous transmissions may also be mitigated by the Link-16 capture effect, by the best-effort delivery paradigm, and by line-of-sight communication over a large geographical area. Unlike many protocols where performance deteriorates dramatically when their control parameters are only slightly impaired, the invention is robust against inaccuracies in its control parameter N.

Some examples of the invention include a static component and a dynamic component. However, some embodiments include only the static component, and other embodiments could include only the dynamic component. The static component minimizes the probability of excessive simultaneous transmissions under the worst-case scenario in which all of the $N_i$ users want to access the ith time slot, whereas the dynamic component increases the probability that at least one of the $N_i$ users will transmit when the users are lightly loaded (having little data to transmit), and also ensures that each user gets a fair share of the channel capacity independent of the stochastic nature of its traffic. The two components together provide a proper balance: At one extreme when the users are all heavily loaded (having much data to transmit), the protocol operates nearly exclusively with the static component, thereby minimizing excessive simultaneous transmissions. At the other extreme when users are lightly loaded, the protocol operates with the dynamic mode, thereby allowing a user quick access to the channel when its transmission needs increase.

II. OPERATIVE ENVIRONMENT

Figure 2:
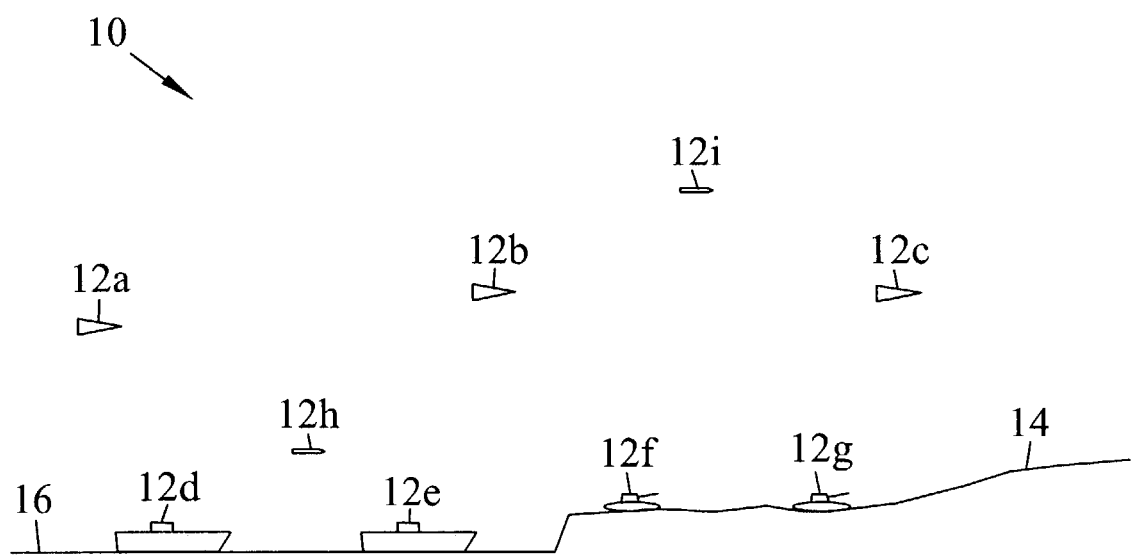
FIG. 2 is a diagram of an exemplary operative environment of the invention.

FIG. 2 shows an example of an operative environment 10 of the invention. A plurality of units 12a-i, which can also be called platforms, or users, are shown deployed on and above the ground 14 and a body of water 16. Each unit 12a-i includes a suitable transceiver system. The units 12a-i may be any vehicles, vessels, crafts, or other apparatuses that can house an appropriate transceiver system. In the example shown in FIG. 2, the plurality of units 12a-e includes aircraft 12a-c (such as jets, airplanes, helicopters, and UAVs [unmanned aerial vehicles], ships 12d-e, tanks 12f-g, and missiles 12h-i). Each type of unit may be manned or unmanned. In alternative embodiments, the units 12a-i could include space craft, submarines, and/or devices that could be carried by or attached to personnel.

III. HARDWARE COMPONENTS AND INTERCONNECTIONS

One aspect of the invention is a transceiver system, that may also be called a transceiver, terminal, unit, or platform, or communications platform. As an example, the transceiver system may be embodied by the hardware components and interconnections of the Link-16 terminal 18 shown in FIG. 3. The terminal 18 includes a receiver 20, a transmitter 22, and a memory 24, which are coupled to a processor 26. The receiver 20 includes a receiving antenna 28 and appropriate radio frequency receiving circuitry 30, and similarly, the transmitter 22 includes a transmitting antenna 32 and appropriate radio frequency transmitting circuitry 34. In alternative embodiments, the receiver 20 and transmitter 22 could operate with electromagnetic waves having frequencies above, and/or below, radio frequencies. As an example, the memory 24 may include Random Access Memory circuitry (RAM), and/or nonvolatile memory such as one or more hard drives, optical drives, or magnetic or optical tape. The memory 24 may be used to store programming instructions executed by the processor 26. A portion of the memory 24 may be provided on the processor 26, and in an alternative embodiment, all of the memory 24 could be incorporated on the processor 26. The processor 26 may be implemented with one or more digital processing device having sufficient computing power. Also, the processor 26 could be a cluster of processors, or one or more digital signal processors, or could be one or more Application Specific Integrated Circuits (ASICs). The terminal 18 may also include an input 36 and/or an output 38, such as a bus, cable, network interface, socket, disk or disc drive, tape drive, or other means for the processor 26 to input and/or output data.

IV. OPERATION

In addition to the various hardware embodiments described above, a different aspect of the invention concerns a method for determining whether to transmit a signal during a time slot.

A. Signal-Bearing Media

Figure 3:
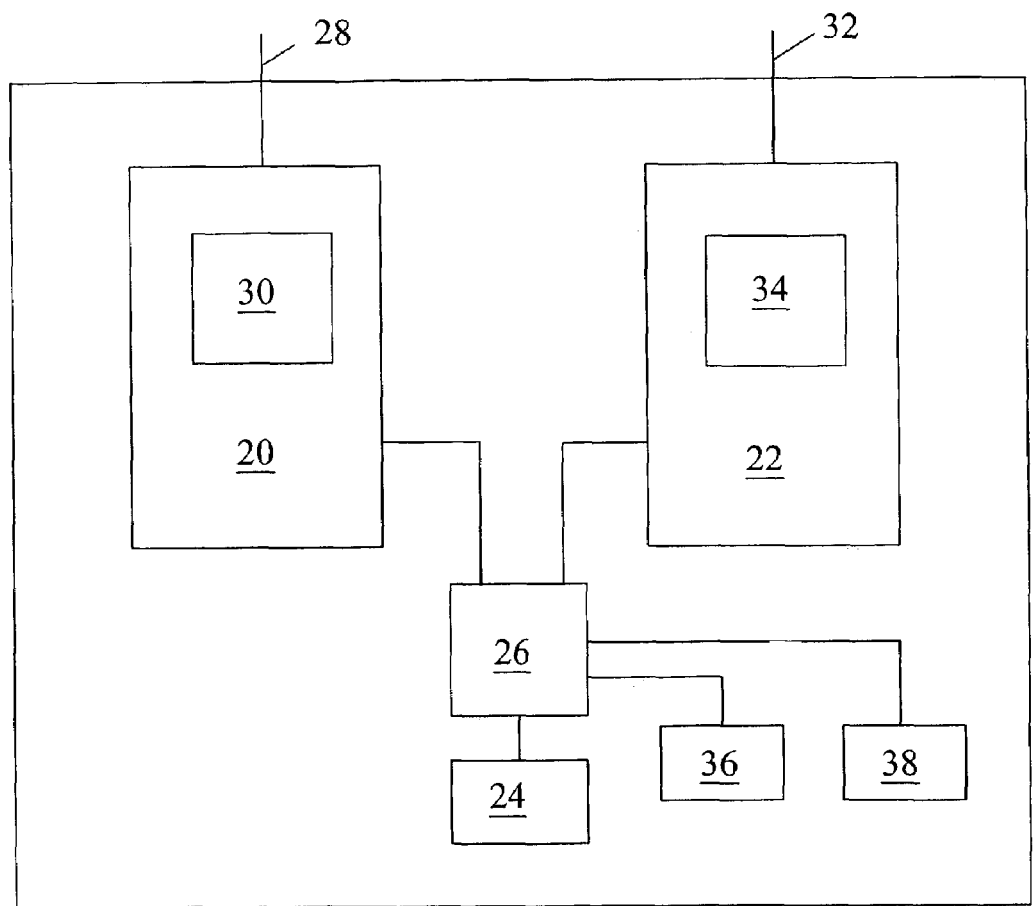
FIG. 3 is a block diagram of a Link-16 terminal in accordance with an exemplary embodiment of the invention.

In the context of FIG. 3, method aspects of the invention may be implemented, for example, by operating the processor 26 to execute a sequence of machine-readable instructions, which can also be referred to as code. These instructions may reside in various types of signal-bearing media. In this respect, one aspect of the present invention concerns a programmed product, comprising a signal-bearing medium or signal-bearing media tangibly embodying a program of machine-readable instructions executable by a digital processing apparatus to perform a method for determining whether to transmit a signal during a time slot.

Figure 4:
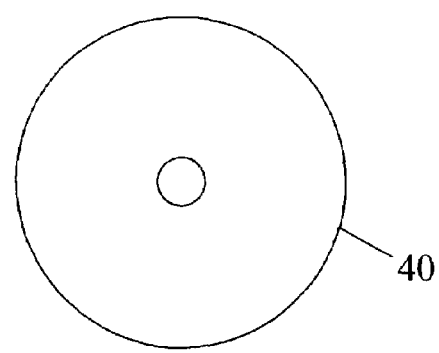
FIG. 4 shows an exemplary signal-bearing medium in accordance with an exemplary embodiment of the invention.
Figure 5A:
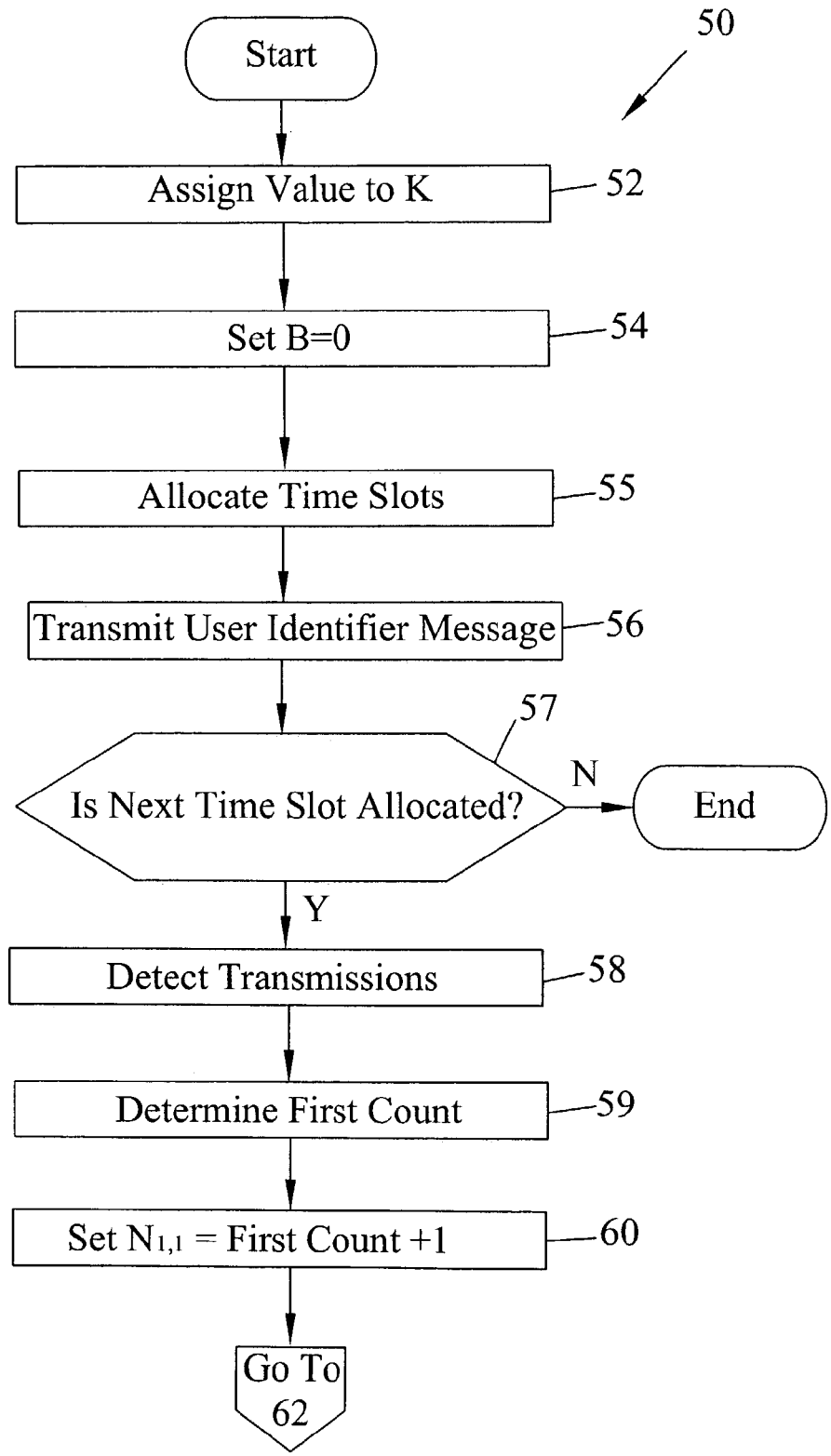
FIGS. 5A-D are a flowchart showing an operative sequence for determining whether to transmit a signal during a time slot in accordance with an exemplary embodiment of the invention.
Figure 5B:
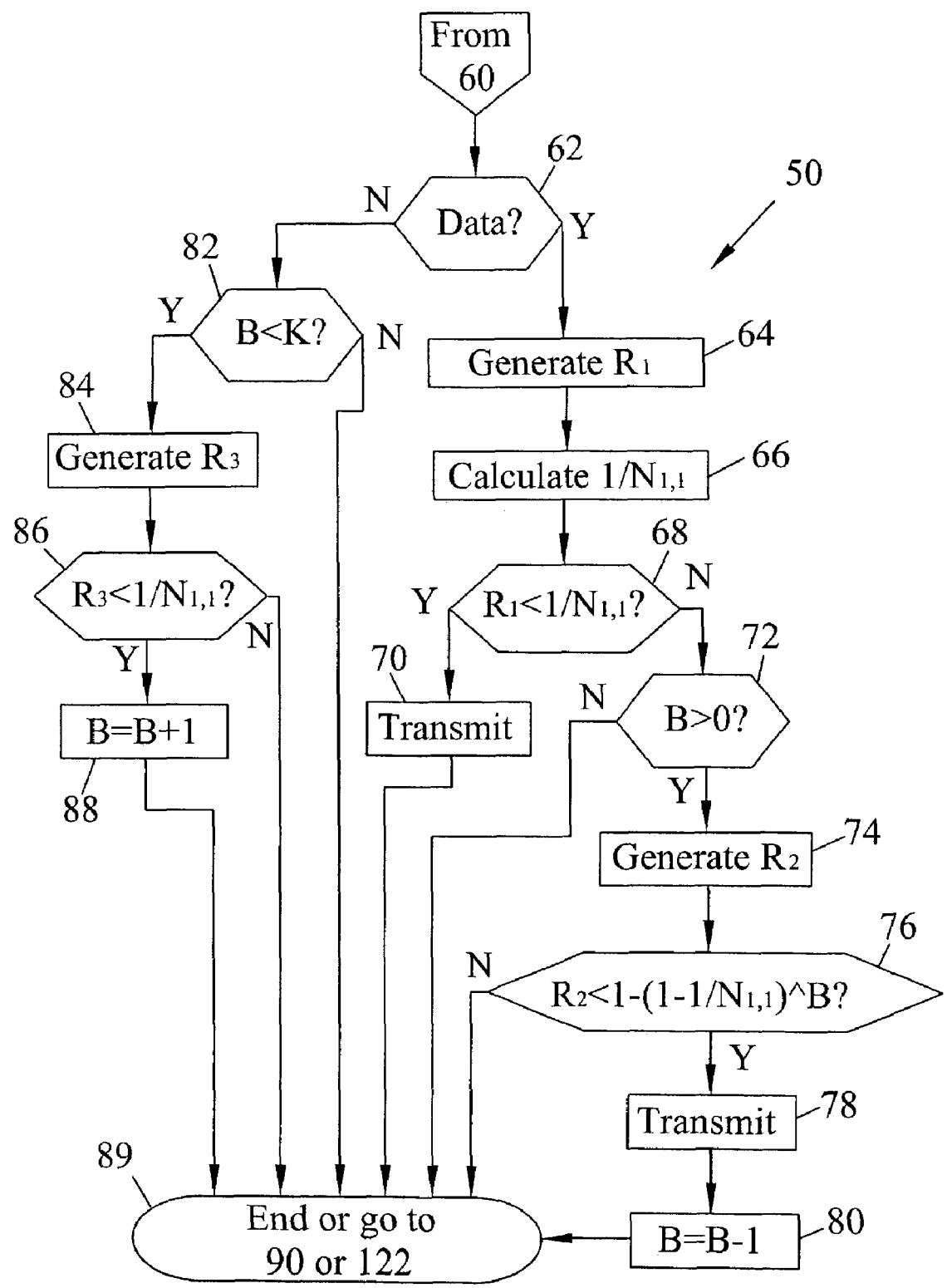
Figure 5C:
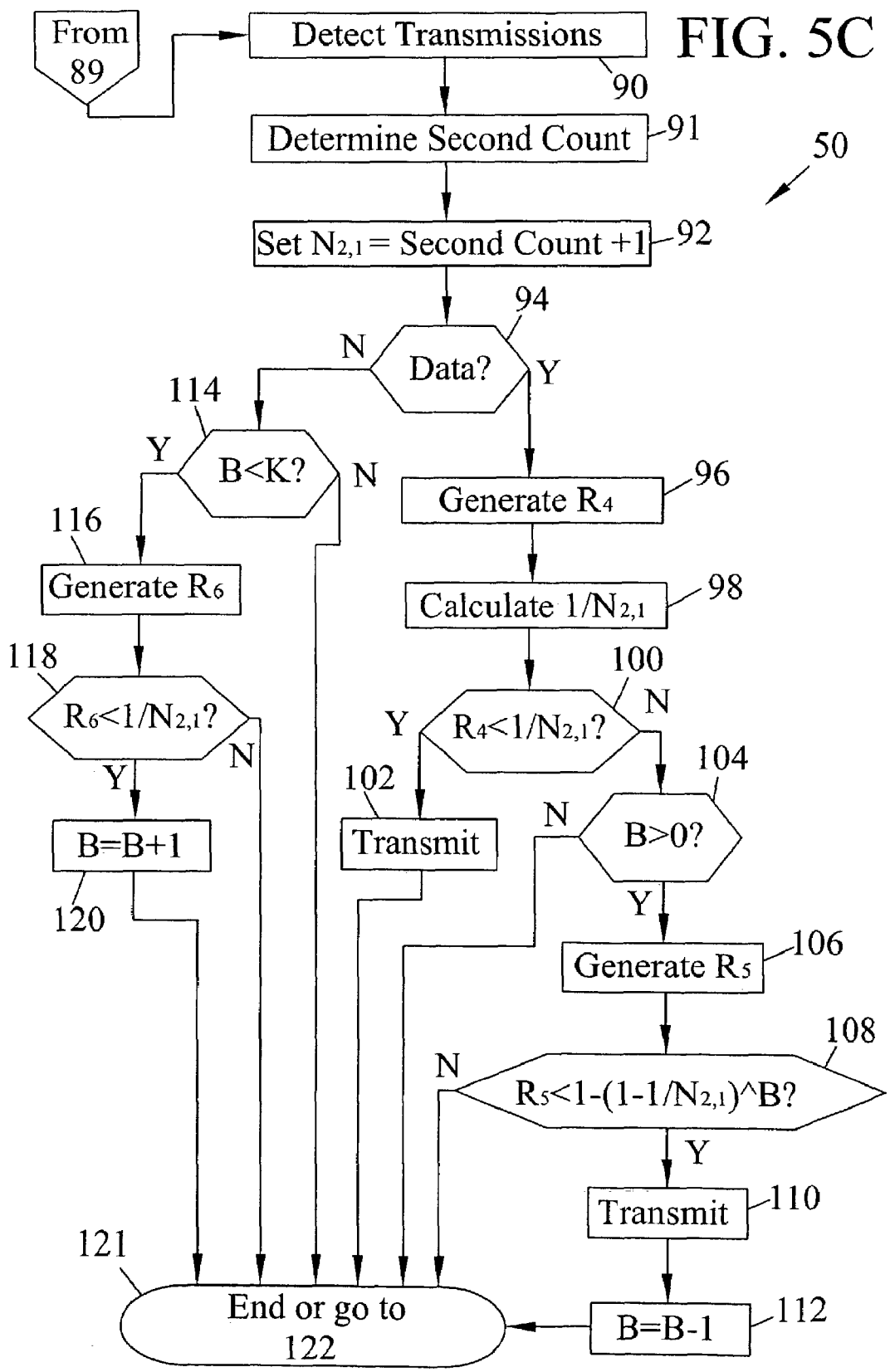
Figure 5D:
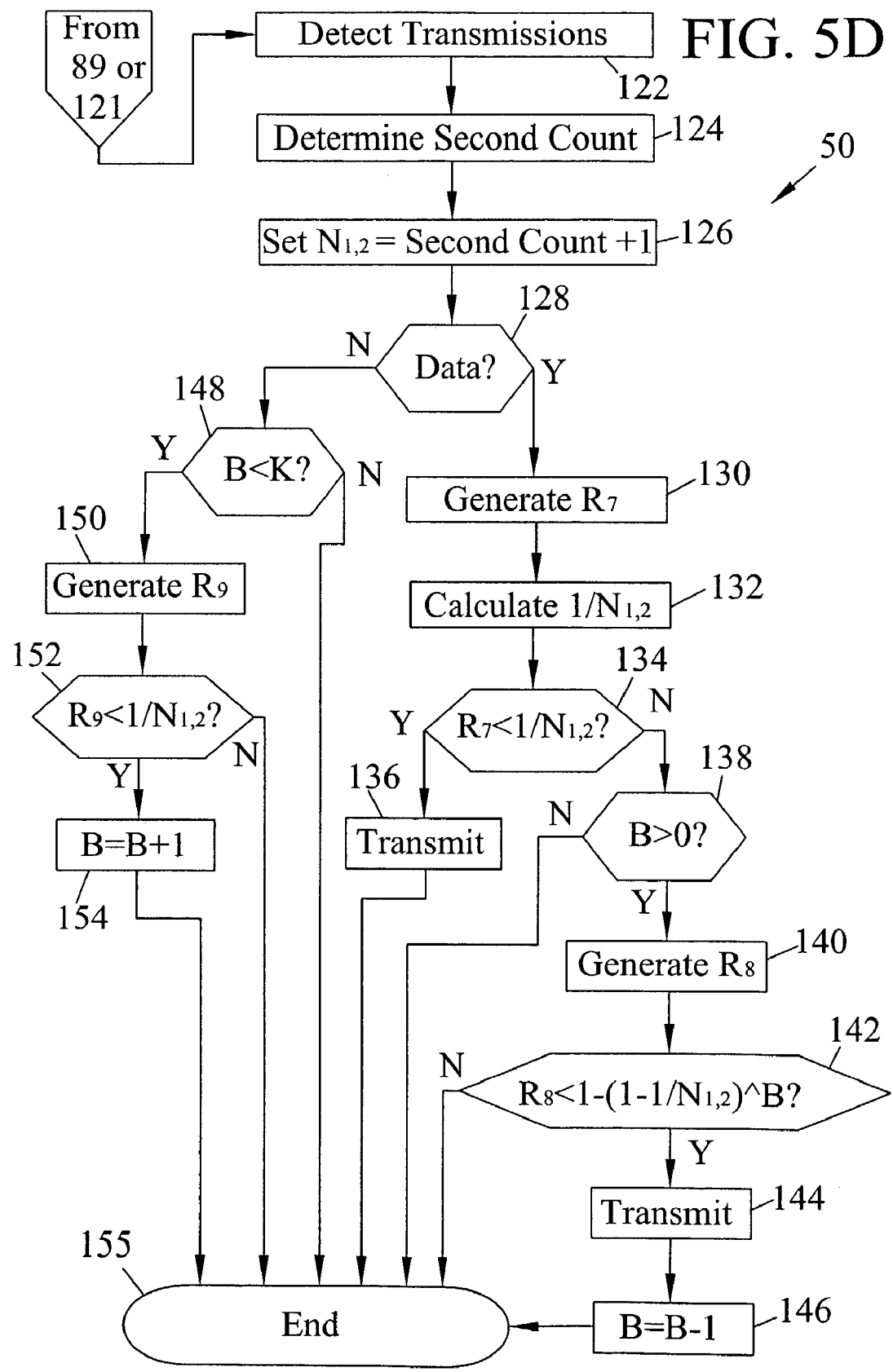

This signal-bearing medium may comprise, for example, the memory 24. Alternatively, the instructions may be embodied in a signal-beating medium such as the optical data storage disc 40 shown in FIG. 4. The optical disc 40 can be any type of signal bearing disc or disk, for example, a CD-ROM, CD-R, CD-RW, WORM, DVD-R, DVDIR, DVD-RW, or DVD+RW. Whether contained in the terminal 18 or elsewhere, the instructions may be stored on any of a variety of machine-readable data storage mediums or media, which may include, for example, direct access storage (such as a conventional "hard drive", a RAID array, or a RAMAC), a magnetic data storage diskette (such as a floppy disk), magnetic tape, digital optical tape, RAM, ROM, EPROM, EEPROM, flash memory, magneto-optical storage, pager punch cards. As an example, the machine-readable instructions may comprise software object code compiled from a language such as Fortran.

B. Overall Sequence of Operation

An example of the method aspect of the present invention is illustrated in FIGS. 5A-D, which show a sequence 50 for a method for determining whether to transmit a signal during a time slot. For ease of explanation, but without any intended limitation, the example of FIG. 5 is described in the context of the terminal 18 and the operative environment 10 described above. Sequence 50 may begin with operation 52, which may be included in the sequence 50. Operation 52 comprises assigning a value to a variable K. K is a traffic dependent parameter, and is related to the bursty nature of traffic. Generally, a larger value will be used for K for bursty traffic than for less bursty traffic. As an example, the value of K could be $0 \leq K \leq 20$. However, K could be 50 or larger. As an example, the value for K may be loaded into software (programmed into) the terminal 18. The value of K may be determined during network preplanning, and may be delivered to the terminal 18 on a signal bearing medium such as, for example, a floppy disk, an optical disk, or magnetic or optical tape. Alternatively, the value of K could also be delivered to the terminal 18 over the Internet. In some embodiments, along with the value for K, cryptology and frequency hopping information may also be delivered to the terminal 18, to be programmed into the terminal 18.

The sequence 50 may also include operation 54, in which a variable B, which in this case may be referred to as $B_{1,1}$, is set equal to an initial value, for example zero. In alternative embodiments, the variable B could be set to values other than zero. As described below, the sequence 50 may include determining if the value of B is less than the value of K.

The sequence 50 may also include operation 55, in which a plurality of time slots per frame (also called a cycle), are allocated to a first designated user. If time slots are allocated to the first designated user, then the first designated user does not transmit any signals during time slots that are not allocated to the first designated user. As an example, operation 55 may comprise allocating a plurality of time slots per frame to each user in a network participation group (NPG). If time slots are allocated to the users in a network participation group, then each user in the network participation group does not transmit any signals during time slots that are not allocated to the NPG.

The sequence 50 may also include operation 56, in which the first designated user transmits at least one user identifier message. Typically, all of the users will transmit user identifier messages.

If the sequence 50 includes operation 55, in which a plurality of time slots per frame are allocated to the first designated user, then the sequence 50 also includes operation 57, which comprises determining if the next time slot in the cycle is a time slot that was allocated to the first designated user. If in operation 55, a plurality of time slots per frame are allocated to each user in a network participation group, then each user in the network participation group carries out operation 57. If in operation 57 it is determined that the next time slot is not an allocated time slot, then the sequence 50 may end, and may be repeated for a subsequent time slot. If in operation 57 it is determined that the next time slot is an allocated time slot, then the sequence continues.

The sequence 50 includes operation 58, in which a first designated user detects transmissions from a first group of users. As an example, the user and the first group of users may be the units 12a-i. Any number of users may be present within the detection range of any other user. For example, 20, 100, 200, or more users' transmissions could be detected by the first designated user. The transmissions from the first group of users may be detected by the first designated user during a first prescribed time period. As an example, the first prescribed time period may be the immediately preceding 3 minutes. However, longer or shorter time periods could be used, and the length of the time period may be a setable parameter. The transmissions may include only nonvoice data, or only voice data, or both voice and nonvoice data, and/or any other type of information.

As an example, the transmissions may be detected on a broadcast channel, which may be, for example, a Link-16 broadcast channel. Link-16 uses broadcast message delivery and a best effort delivery paradigm in which messages are transmitted with no guarantee that they will be received. However, many types of messages, for example Precise Participant Location and Identification (PPLI) messages, may be retransmitted, and consequently the failure to receive these messages each time they are transmitted is not a significant problem. Due to the frequencies used with Link-16, for example 960 MHz to 1215 MHz, the transmitted signals have Line Of Sight (LOS) propagation, which inherently limits communications and interference to only transmitters and receivers that are within LOS (one hop) from each other. Signals that are within one hop may be received without being relayed. The distance between transmitters and receivers may be extended if relays are used. PPLI messages are relayed only once, and consequently, the maximum distance over which PPLI messages can be received is two hops. Some other types of messages may be relayed more than one time, and some messages may include information that explicitly states the number of times that they are to be relayed. Link-16 also uses the capture effect, wherein if there are two or more simultaneous transmissions, the closest signal will be captured by a receiver and will be received despite interference from other signals. Due to the use of LOS transmissions and the capture effect, simultaneous transmissions will not necessarily result in missed transmissions. Also, some types of messages may be receive compliant, which means that they will be retransmitted if the intended receiver does not acknowledge that the message was received. Message error rates generally fluctuate, and as an example, may be 1% or more. Link-16 supports both data and voice communications. Particular timeslots are reserved for voice, which may be used by a user while the user presses a Push To Talk (PTT) button.

In other embodiments, the transmissions may be detected over any type of communications channel or network, which may include, for example, wireless, or wired (electrical or optical) communications channels, and mobile or nonmobile users. As an example, the communications channel may be one or more bands of frequencies transmitted as radio frequency waves.

The transmissions from users that are detected by the first designated user may be PPLI transmissions. However, any types of transmissions may be detected by the first designated user. In some embodiments, only transmissions from users that are within two hops from the first designated user are detected by the first designated user. As an example, the first designated user may detect transmissions only from users that are within two hops from the first designated user because in some applications transmissions are relayed no more than one time. In some embodiments, only transmissions from users that are within one hop from the first designated user are detected by the first designated user. This may be the case if users' transmissions are not relayed.

In an alternative embodiment, spare bits in PPLI messages could be used to identify if a unit is a user of a particular time slot.

Operation 59 comprises determining a first count of the number of users in the first group of users, by counting the number of users from which transmissions are detected by the first designated user in operation 58. The first count of the number of users may be determined by counting all users' transmissions that are detected by the first designated user. Alternatively, the first count of the number of users may be determined by counting a subset of users' transmissions that are detected by the first designated user. In this alternative embodiment different subsets of users could statistically share subsets of time slots within a TDMA frame. As an example, a subset of users' transmissions that are detected by the first designated user may be transmissions from users that are in a communications group (for example, a network participation group) with the first designated user, and only that subset of detected users' transmissions are included in the count. In another alternative embodiment, the subset of users' transmissions that are detected by the first designated user may be transmissions from a subset of users that are in a communications group. As an example, a communications group could be defined by a subset of users that are assigned to a particular set of time slots.

In operation 60, the value of a variable N, which in this case is $N_{1,1}$, is set equal to one plus the first count. Generally, for $N_{i,j}$, i is the number of a time slot in a cycle having T time slots (a TDMA frame having T time slots), j is the number corresponding with a particular user (which may also be called a unit, terminal, or platform), and the number $N_{i,j}$ is the number of other units that the $j^{th}$ unit is aware of (or sees) for the $i^{th}$ time slot. As an example, in embodiments where a Link-16 communications channel is used, $N_{i,j}$ is the number of units the $j^{th}$ unit has identified that are within two hops of the $j^{th}$ unit, for the $i^{th}$ time slot. The number of operations in the sequence 50 is independent of the value of $N_{i,j}$. Even when Nij is a large number, the probability of a simultaneous transmission is low, and even if there is a simultaneous transmission, in many instances the information will be retransmitted and received in a retransmission.

The sequence 50 also includes operation 62, which comprises determining whether the first designated user has data to transmit during a first time slot. If in operation 62 it is determined that the first designated user has data to transmit during the first time slot, then the sequence 50 also includes generating a first random number $R_1$ ($0 \leq R_1 \leq 1$) in operation 64, calculating $1/N_{1,1}$, in operation 66, and determining if the first random number $R_1$ is less than $1/N_{1,1}$, in operation 68. If in operation 68 it is determined that the first random number is less than $1/N_{1,1}$, then the sequence 50 also includes operation 70, in which the first designated user transmits a first time slot signal during the first time slot. Since the decision of whether to transmit is made by comparing $1/N_{1,1}$ to the first random number, small errors in determining $N_{1,1}$ will not have a significant effect on the outcome.

If in operation 68 it is determined that the first random number is not less than $N_{1,1}$, then the sequence 50 may also include additional operations beginning with operation 72. Operation 72 comprises determining whether the value of a variable B, which in this case may be referred to as $B_{1,1}$, is greater than zero. As discussed above with regard to operation 54, in operation 54 the variable B may be set equal to zero or some other initial value. If in operation 72 it is determined that the value of the variable $B_{1,1}$ is greater than zero, then the sequence 50 further comprises generating a second random number $R_2$ ($0 \leq R_2 \leq 1$) in operation 74, and determining whether the second random number is less than $1-(1-1/N_{1,1})^{B_{1,1}}$ in operation 76. Herein the symbol "^" means "raised to the power". If in operation 76 it is determined that the second random number is less than $1-(1-1/N_{1,1})^{B_{1,1}}$, then the sequence also includes transmitting the first time slot signal from the first designated user during the first time slot in operation 78, and subtracting one from the value of $B_{1,1}$ in operation 80.

If in operation 62 it is determined that the first designated user does not have data to transmit during the first time slot, then the sequence 50 may also include additional operations beginning with operation 82. Operation 82 comprises determining if $B_{1,1}$ is less than the value of a prescribed variable K. If in operation 82 it is determined that $B_{1,1}$ is less than the value of a prescribed variable K, then the sequence 50 also includes generating a third random number $R_3$ ($0 \leq R_3 \leq 1$) in operation 84, and determining if the third random number is less than $1/N_{1,1}$ in operation 86. If in operation 86 it is determined that the third random number is less than $1/N_{1,1}$, then the sequence 50 also includes adding one to the value of $B_{1,1}$ in operation 88. Thus, the value of B changes as a function of the user's traffic. In many applications the rate of traffic is of a burst nature. When a user has had light traffic, B will increase for the user, thereby increasing the probability that the user will be able to transmit soon after the user has a message to transmit.

If in operation 82 it is determined that $B_{1,1}$ is not less than the value of the prescribed variable K, or if in operation 86 it is determined that the third random number is not less than $1/N_{1,1}$, then the sequence 50 may end or may be repeated in part or in entirety for a subsequent time slot, or the sequence 50 may be continued with operations 90 or 122, as indicated in oval 89. Similarly, if in operation 72 it is determined that the value of the variable $B_{1,1}$ is not greater than zero, or if in operation 76 it is determined that the second random number is not less than $1-(1-1/N_{1,1})^{B_{1,1}}$, then the sequence 50 may end or may be repeated in part or in entirety for a subsequent time slot, or the sequence 50 may be continued with operations 90 or 122. Similarly, after operations 88, 70, or 80, the sequence 50 may end or may be repeated in part or in entirety for a subsequent time slot, or the sequence 50 may be continued with operations 90 or 122.

The sequence 50 may include the additional operations beginning with operation 90. In operation 90 the first designated user detects transmissions from a second group of users during a second prescribed time period. The first group of users and the second group of users may be the same users, or, the first group of users and the second group of users may not be identical sets of users. Operation 91 comprises determining a second count of the number of users in the second group of users. In operation 92, the value of a variable $N_{2,1}$ is set equal to one plus the second count. Operation 94 comprises determining whether the first designated user has data to transmit during a second time slot. If in operation 94 it is determined that the first designated user has data to transmit during the second time slot, then the sequence 50 also includes generating a fourth random number $R_4$ ($0 \leq R_4 \leq 1$) in operation 96, calculating $1/N_{2,1}$ in operation 98, and determining if the fourth random number is less than $1/N_{2,1}$ in operation 100. If in operation 100 it is determined that the fourth random number is less than $1/N_{2,1}$, then the sequence 50 also includes operation 102, which comprises transmitting a second time slot signal from the first designated user during the second time slot.

If in operation 100 it is determined that the fourth random number is not less than $N_{2,1}$, then the sequence 50 may also include additional operations beginning with operation 104. Operation 104 comprises determining whether the value of a variable $B_{2,1}$ is greater than zero. If in operation 104 it is determined that the value of $B_{2,1}$ is greater than zero, then the sequence 50 further includes generating a fifth random number $R_5$ ($0 \leq R_5 \leq 1$) in operation 106, and determining whether the fifth random number is less than $1-(1-1/N_{2,1})^{B_{2,1}}$ in operation 108. If in operation 108 it is determined that fifth random number is less than $1-(1-1/N_{2,1})^{B_{2,1}}$ then the sequence 50 also includes transmitting the second time slot signal from the first designated user during the second time slot in operation 110, and subtracting one from the value of $B_{2,1}$ in operation 112.

If in operation 94 it is determined that the first designated user does not have data to transmit during the second time slot, then the sequence 50 may include further operations beginning with operation 114. Operation 114 comprises determining if $B_2$, is less than K. If in operation 114 it is determined that $B_{2,1}$ is less than K, then the sequence 50 also includes generating a sixth random number $R_6$ ($0 \leq R_6 < 1$) in operation 116, and determining if the sixth random number is less than $1/N_{2,1}$ in operation 118. If in operation 118 it is determined that the sixth random number is less than $1/N_{2,1}$, then the sequence 50 also includes adding one to the value of $B_{2,1}$ in operation 120. When processing arrives at oval 121 in the sequence 50, the sequence 50 may end, or may be repeated in part or in entirety for a subsequent time slot, or the sequence 50 may be continued with operation 122.

The sequence 50 may include additional operations beginning with operation 122, which may be performed instead of, or in addition to, performing one or more of the additional operations described above starting with operation 90. In operation 122 a second designated user detects transmissions from a second group of users during a second prescribed time period. The first group of users and the second group of users may be the same users, or, the first group of users and the second group of users may not be identical sets of users. The second prescribed time period may be the same time period as the first prescribed time period, or may be a different time period than the first prescribed time period. Operation 124 comprises determining a second count of the number of users in the second group of users. In operation 126 the value of a variable $N_{1,2}$ is set equal to one plus the second count. Operation 128 comprises determining whether the second designated user has data to transmit during the first time slot. If in operation 128 it is determined that the second designated user has data to transmit during the first time slot, then the sequence 50 also includes generating a seventh random number $R_7$ ($0 \leq R_7 \leq 1$) in operation 130, calculating $1/N_{1,2}$ in operation 132, and determining if the seventh random number is less than $1/N_{1,2}$ in operation 134. If in operation 134 it is determined that the seventh random number is less than $1/N_{1,2}$, then the sequence 50 also includes operation 136, which comprises transmitting a second designated user signal from the second designated user during the first time slot.

If in operation 134 it is determined that the seventh random number is not less than $1/N_{1,2}$, then the sequence 50 may include additional operations beginning with operation 138. Operation 138 comprises determining whether the value of a variable $B_{1,2}$ is greater than zero. If in operation 138 it is determined that the value of $B_{1,2}$ is greater than zero, then the sequence 50 also includes generating a eighth random number $R_8$ ($0 \leq R_8 \leq 1$) in operation 140, and determining whether the eighth random number is less than $1-(1-1/N_{1,2})^{B_{1,2}}$ in operation 142. If in operation 142 it is determined that the eighth random number is less than $1-(1-1/N_{1,2})^{B_{1,2}}$, then the sequence 50 also includes transmitting the second designated user signal from the second designated user during the first time slot in operation 144, and subtracting one from the value of $B_{1,2}$ in operation 146.

If in operation 128 it is determined that the second designated user does not have data to transmit during the first time slot, then the sequence 50 may include additional operations beginning with operation 148. Operation 148 comprises determining if $B_{1,2}$ is less than K. If in operation 148 it is determined that $B_{1,2}$ is less than K, then the sequence 50 further includes generating a ninth random number $R_9$ ($0 \leq R_9 \leq 1$) in operation 150, and determining if the ninth random number is less than $1/N_{1,2}$ in operation 152. If in operation 152 it is determined that the ninth random number is less than $1/N_{1,2}$, then the sequence 50 also includes adding one to the value of $B_{1,2}$ in operation 154. When processing arrives at oval 155 in the sequence 50, the sequence 50 may end, or may be repeated in part or in entirety for a subsequent time slot.

V. DERIVATION OF EQUATIONS

A. Introduction

Figure 6:
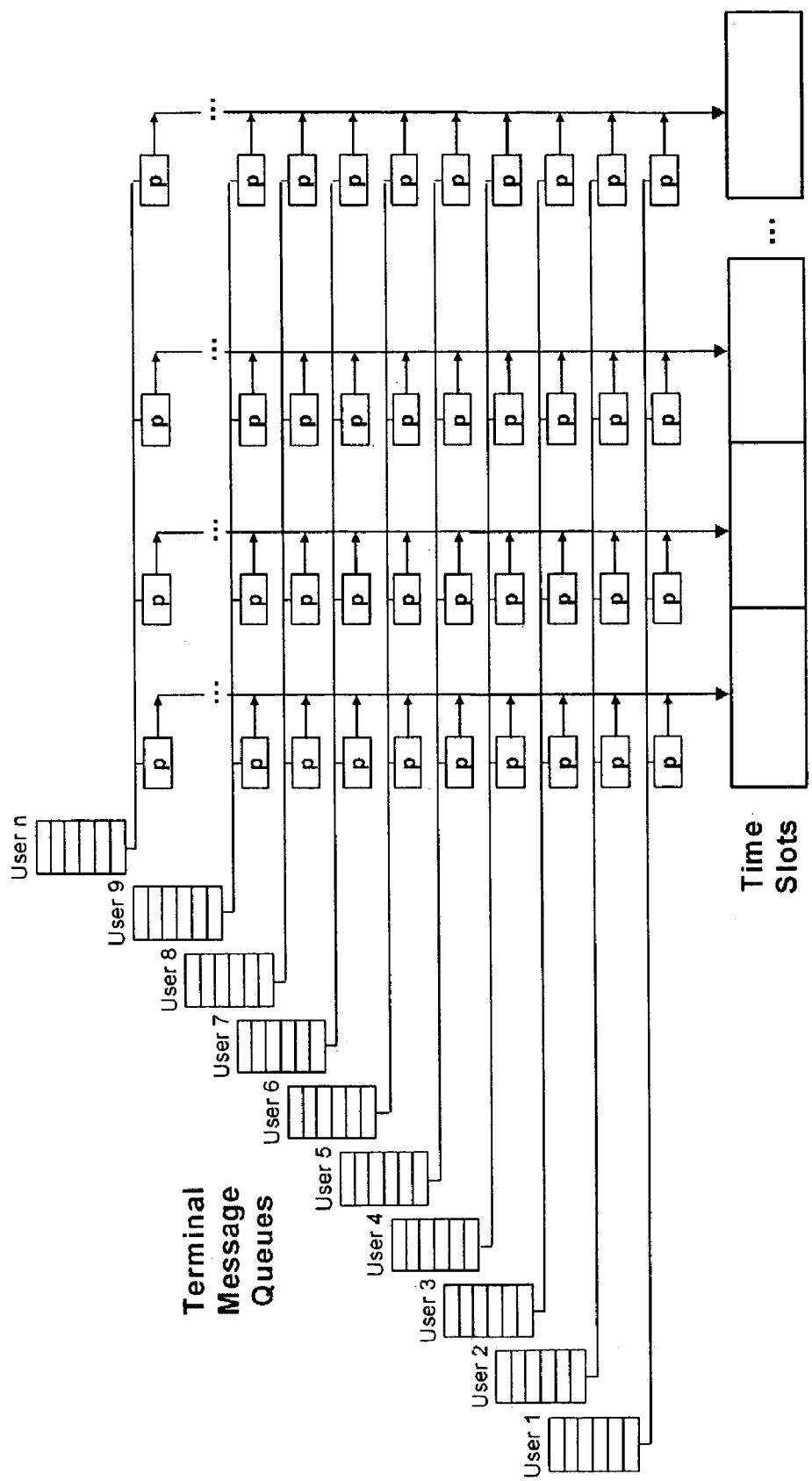
FIG. 6 is a depiction of the multiple access protocol in accordance with an exemplary embodiment of the invention.

With the Dedicated Access protocol depicted in FIG. 1, the user that has exclusive access to the ith time slot will transmit if it has a message to send. In contrast, as shown in FIG. 6, with the invention a user $U_j$ statistically shares the ith time slot with $N_i-1$ other users and transmits with probability $p_{i,j}$ when it has a message in its queue, where in some embodiments, $p_{i,j}$ is given by the following equation:

$$p_{i,j} = \frac{1}{N_i} + \left(1 - \frac{1}{N_i}\right)\left[1 - \left(\frac{1}{N_i}\right)^{B_{i,j}}\right]$$

The first and second summands of the equation represent the static and the dynamic components of the protocol, respectively. The variable $B_{i,j}$ fluctuates depending on the traffic characteristics of $U_j$. Since the probability $p_{i,j}$ increases (decreases) as $B_{i,j}$ increases (decreases), the changes in the user's traffic modulates how $U_j$ accesses the ith time slot. To facilitate the description of how the variable $B_{i,j}$ changes, the variable $X_{i,j}$ is defined to be the indicator function of whether user $U_j$ has a packet to transmit during the ith time slot; that is, $X_{i,j}=1$ if $U_j$ has a packet to transmit during the ith time slot and $X_{i,j}=0$ otherwise. The variable $B_{i,j}$ is the heart of the dynamic component. FIG. 6 shows that, with the invention, all users statistically share every time slot. However, the invention can be much more general. For example, different subsets of users can statistically share any subsets of time slots within a TDMA frame.

The variable $B_{i,j}$ increases when $U_j$ is lightly loaded and decreases when $U_j$'s traffic increases. After a long idle period during which the user has no messages to send, the user can access a greater share of the channel when its need suddenly increases. If $K_{i,j}$ is set to be infinite, then each user can access up to $1/N_i$ of all applicable time slots, independent of how the messages are generated at the users. The protocol of the invention therefore guarantees fair access to the users independent of the characteristics of their traffic.

B. Design of the Static Component

The goal of the static component is to maximize the probability γ that exactly one user transmits during the time slot when the users are heavily loaded. It is assumed that each of the $N_i$ users always has a packet to transmit (i.e., saturated) and transmits it with probability p whenever the ith time slot comes up. The probability γ can be calculated as follows:

$$\gamma = N_i p (1-p)^{N_i - 1}$$

The choice p* that maximizes γ satisfies the equation $$N_i(1-p^*)^{N_i-2}[1-N_i p^*]=0$$

The choice $p^* = 1/N_i$ therefore maximizes the probability that exactly one of the $N_i$ users transmits during the ith time slot. This result is intuitively satisfying because with $p^* = 1/N_i$ the expected number of transmissions during the time slot is $N_i p^* = 1$.

C. Design of the Dynamic Component

The goal of the dynamic component is to reduce the message delays experienced by a user and to increase the probability that at least one of the $N_i$ users transmits during the time slot regardless of traffic profiles of the users while maintaining fairness of channel access, simplicity, and the ability to minimize excessive simultaneous transmissions. The heart of the dynamic component is the variable $B_{i,j}$. During light traffic periods when the transmission need of user $U_j$ is minimal, the value of $B_{i,j}$ increases, thereby also increasing the probability of the user transmitting in the future if its traffic load suddenly increases. The value of $B_{i,j}$ decreases each time $U_j$ transmits a packet, thereby preventing a user from unfairly monopolizing the channel. Each user can access up to $1/N_i$ of all time slots in a way that is tailored to its own traffic profile, yet the complexity of exercising the protocol remains constant. The only control parameter of the invention is $N_i$. As the number of users changes from $N_i$ to $M_i$, the users can usually determine the change with reasonable confidence, for example, through PPLI messages, and recalibrate the control parameter to $M_i$. Thus, the invention is adaptive to changes in the number of users and to the random, fluctuating traffic loads of the users.

VI. PERFORMANCE EVALUATION

A. Computational Complexity

Space complexity of a protocol refers the amount of computer memory required to execute the protocol. If all N users are allowed to share every time slot, then the space complexity of the protocol is O(1), that is, constant and independent of N. Time complexity of a protocol refers to the number of operations required to execute the protocol. The time complexity of the invention is O(1) because the number of operations required to execute the protocol is constant and independent of N. O(1) is the lowest possible complexity class, and the fact that both the space and time complexities of the protocol are of O(1) demonstrates the simplicity of implementing the invention.

B. Distribution of the Number of Transmitters

A key performance measure of the protocol is its ability to limit the number of simultaneous transmissions even when the number of users, $N_i$, statistically sharing the ith time slot is large. When the $N_i$ users always have messages to send, the number $K_i$ (not to be confused with the prescribed variable K discussed above) of users transmitting during the ith time slot has the following distribution:

$$Pr(K_i = 0) = \left(1 - \frac{1}{N_i}\right)^{N_i}$$

$$Pr(K_i = 1) = \left(1 - \frac{1}{N_i}\right)^{N_i - 1}$$

$$Pr(K_i = 2) = \frac{1}{2}\left(1 - \frac{1}{N_i}\right)^{N_i - 1}$$

$$Pr(K_i \geq 3) = 1 - \left(\frac{5}{2} - \frac{1}{N_i}\right)\left(1 - \frac{1}{N_i}\right)^{N_i - 1}$$

The function $Pr(K_i \geq 3)$ is a nonincreasing function of $N_i$ and, as $N_i \to \infty$, has an asymptotic value of about 0.08. Even when the number of saturated users is infinite, the probability that there are three or more transmitters is about 8%. Such a small probability in spite of the large user population illustrates the scalability of the protocol and its ability to limit excessive simultaneous transmissions (collisions). The function $Pr(K_i=1)+Pr(K_i=2)$ is the probability that one or two users transmit during the time slot, is a nonincreasing function of $N_i$ and has an asymptotic value of 0.55 as $N_i \to \infty$. Although what constitutes an effective use, or throughput, of a time slot in multihop, broadcast network is itself a research issue, in a network with a diameter of several hundred miles and hundreds of users, limiting the number of transmitters to only one or two during a time slot is an effective use of the channel given the capture phenomenon and the best-effort delivery paradigm of Link-16. The invention can provide an effective use of the channel at least 55% of the times even when the number of saturated users is infinite, again illustrating its scalability.

Simulation studies were conducted to verify the validity of the analysis of $K_i$ for N=2, 4, 8, 16, 32, 128, 256 and obtained estimates on $Pr(K_i=1)+Pr(K_i=2)$ by simulation. The analysis and simulation results are tabulated in Table 1. The average relative difference of the results is 0.1165%, which is well within numerical and sampling noise levels; consequently the close agreement validates the analysis.

TABLE 1

| $Pr(K_i = 1) + Pr(K_i = 2)$ by analysis and by simulation | | |
|---|---|---|
| N | Analysis | Simulation | Relative Difference |
| 2 | 0.750000 | 0.750565 | 0.0752% |
| 4 | 0.632812 | 0.632181 | 0.0998% |
| 8 | 0.589043 | 0.588794 | 0.0422% |
| 16 | 0.569718 | 0.569120 | 0.1050% |
| 32 | 0.560601 | 0.559643 | 0.1711% |
| 128 | 0.553984 | 0.554798 | 0.1467% |
| 256 | 0.552899 | 0.553871 | 0.1753% |

C. Channel Access Delay

Channel access delay refers to the time between successive accesses of the channel by a user and is an important measure of the effectiveness of a protocol. The goal of this analysis is to compare the mean access delay of Dedicated Access with that of the invention operating with only its static component.

The parameters of the analysis are defined as follows:

T=the number of time slots per TDMA frame

N=the number of users that are eligible to transmit during each time slot with the invention.

The following assumptions are made:

A user always has a packet to transmit during its eligible time slots.

Under Dedicated Access, each time slot of a TDMA is dedicated to a distinct user; therefore, there are T users.

Under the (some example of the) invention, each user is allocated N time slots per frame, and during each allocated time slots, it transmits with probability 1/N.

The expected number of transmissions by each user is 1 per frame for both protocols.

Figure 7:
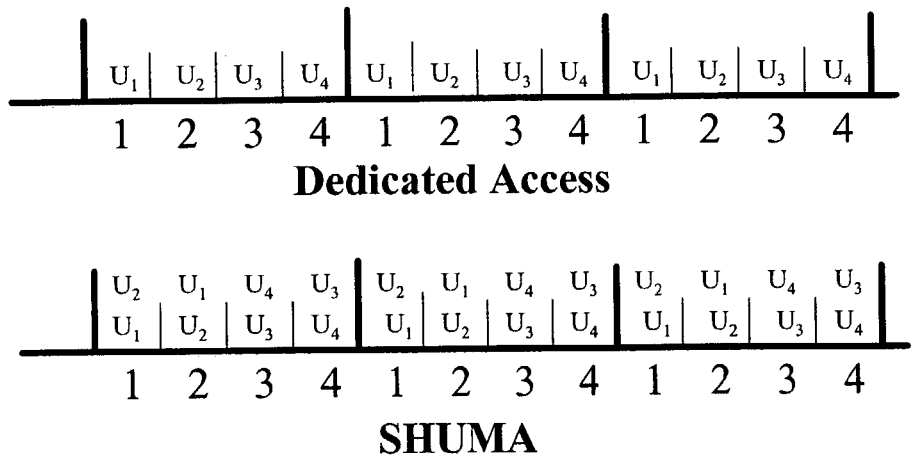
FIG. 7 is a diagram showing a comparison of allocation of time slots for Dedicated Access and for an exemplary embodiment of the invention.

FIG. 7 is shows a comparison of the allocation of time slots for Dedicated Access and for an illustrative embodiment of the invention.

The two performance measures of interest are as follows:

$X_{DA}$=the channel access delay experienced by a user under Dedicated Access, that is, the time (in frames) between successive transmissions by the user.

$X_{SHUMA}$=the channel access delay experienced by a user under the invention, that is, the time (in frames) between successive transmissions by the user. Note that any delay less than T time slots is counted as 1 frame. Because the access delay of the invention can be much smaller than T time slots, the delays of this embodiment of the invention have been overestimated so as to make the results of the analysis more widely applicable.

The random variable $X_{DA}$ has the following probability distribution:

$$Pr(X_{DA}=1)=1$$

The expected value $E(X_{DA})$ and variance $Var(X_{DA})$ of $X_{DA}$ are 1 and 0, respectively. The distribution of the random variable $X_{SHUMA}$ is as follows:

$$Pr(X_{SHUMA}=j) = \left[\left(1-\frac{1}{N}\right)^N\right]^{j-1}\left[1-\left(1-\frac{1}{N}\right)^N\right]$$

for $1 \leq j \leq \infty$.

The mean and variance of $X_{SHUMA}$ are:

$$E(X_{SHUMA}) = \frac{1}{1-\left(1-\frac{1}{N}\right)^N}$$

$$Var(X_{SHUMA}) = \frac{\left(1-\frac{1}{N}\right)^N}{\left[1-\left(1-\frac{1}{N}\right)^N\right]^2},$$

respectively.

If parameter q is defined as $q=q_N=1-(1-1/N)^N$, which is a nonincreasing function of N, then $E(X_{SHUMA})=1/q$ and $Var(X_{SHUMA})=(1-q)/(q^2)$ are both decreasing functions of q and, therefore, nondecreasing functions of N.

The mean and variance of $X_{SHUMA}$ have the following asymptotic values as $N \to \infty$:

$$E(X_{SHUMA}) \leq \lim_{N \to \infty} \frac{1}{1-\left(1-\frac{1}{N}\right)^N} = \frac{1}{1-e^{-1}} = 1.5820 E(X_{DA})$$

$$Var(X_{SHUMA}) \leq \lim_{N \to \infty} \frac{\left(1-\frac{1}{N}\right)^N}{\left[1-\left(1-\frac{1}{N}\right)^N\right]^2} = \frac{e^{-1}}{(1-e^{-1})^2} = 0.9206$$

In many stochastic protocols, the variability of the performance typically increases as the number of users increases. The invention has the interesting property that the variance of its access delays does not increase without bound as N increases, again demonstrating the protocol's scalability.

The tail distribution of $X_{SHUMA}$ is as follows:

$$Pr(X_{SHUMA} \geq H)=(1-q)^{H-1} \text{ for } H=1, 2, \ldots, \infty \text{ [}(1-q) \leq 0.3679\text{]}$$

The tail distribution $Pr(X_{SHUMA} \geq H)$ decreases exponentially as H increases, and indicates that long access delays are unlikely.

$Pr(X_{SHUMA}=1)=1-Pr(X_{SHUMA}>2) \geq 0.6321$. In this example, an access delay less than 1 TDMA frame under Dedicated Access is impossible. Under the invention, however, not only is an access delay of less than 1 TDMA frame possible, the relative frequency with which it occurs is greater than 0.63, about two-thirds of the time.

In summary, examples of the invention exhibit the following characteristics even without using its dynamic component:

The variability of the access delays does not increase without bound as the number of users increases.

In at least 63% of the cases, the invention results in shorter access delays than Dedicated Access.

Simulation studies were conducted to verify the validity of the analysis of $Pr(X_{SHUMA}=j)$ for N=2, 4, 8, 16, 32, 128, 256 and obtained estimates on $Pr(X_{SHUMA}=1)$ by simulation. The analysis and simulation results are tabulated in Table 2. The average relative difference of the results is 0.246%, which is well within numerical and sampling noise levels; the close agreement validates the analysis.

TABLE 2

$Pr(X_{SHUMA} = 1)$ by analysis and by simulation

| N | Analysis | Simulation | Difference |
|---|----------|------------|------------|
| 2 | 0.750000 | 0.757298 | 0.9636% |
| 4 | 0.683593 | 0.684095 | 0.0733% |
| 8 | 0.656391 | 0.656855 | 0.0706% |
| 16 | 0.643925 | 0.644131 | 0.0319% |
| 32 | 0.637944 | 0.636927 | 0.1596% |
| 128 | 0.633562 | 0.633684 | 0.1925% |
| 256 | 0.632840 | 0.634309 | 0.2315% |

D. Robustness

Many protocols can perform well when operating under ideal conditions, such as operating in an error-free channel without simultaneous transmissions, jamming, and line-ofsight limitations; however, when conditions depart even slightly from the ideal, the performance of these protocols degrades very dramatically.

The invention does not suffer from this type of sensitivity, and its performance remains robust against errors. The single control parameter of the protocol of the invention is N, the number of users that are statistically sharing the time slot. How an error in N affects the effective use of the channel is of interest. To assess the sensitivity of the protocol to errors in the control parameter, the perfect case, designated Case A, in which there are N users and each transmits with the correct probability of 1/N is compared with the imperfect case, designated Case B, where there are (N+M) users, but only M users transmit with the correct probability of 1/(N+M) and N users transmit with the incorrect probability of 1/N.

Let $X_1$ and $X_2$ be the number of users transmitting during a time slot in Case A and Case B, respectively. Then $X_1$ and $X_2$ have the following distributions:

$$Pr(X_1 = k) = \binom{N}{k}\left(\frac{1}{N}\right)^k\left(1-\frac{1}{N}\right)^{N-k} \quad 1 \leq k \leq N$$

$$Pr(X_2 = k) = \sum_{\substack{i=0,\\i \leq M,\\k-i \leq N}}^{k} \binom{M}{i}\left(\frac{1}{N+M}\right)^i\left(1-\frac{1}{N+M}\right)^{M-i}\binom{N}{k-i}\left(\frac{1}{N}\right)^{k-i}\left(1-\frac{1}{N}\right)^{N-k+i}$$

If it is assumed that restricting the number of transmitters to only one or two during a time slot constitutes an effective use of the time slot, and if throughput $\lambda$ is defined as the percentage of time slots during which there are only one or two transmitters, then $\lambda(A)$ and $\lambda(B)$, the throughput for Case A and Case B, respectively, can be computed as follows:

$$\lambda(A) = Pr(X_1=1) + Pr(X_1=2)$$

$$\lambda(B) = Pr(X_2=1) + Pr(X_2=2)$$

Figure 8:
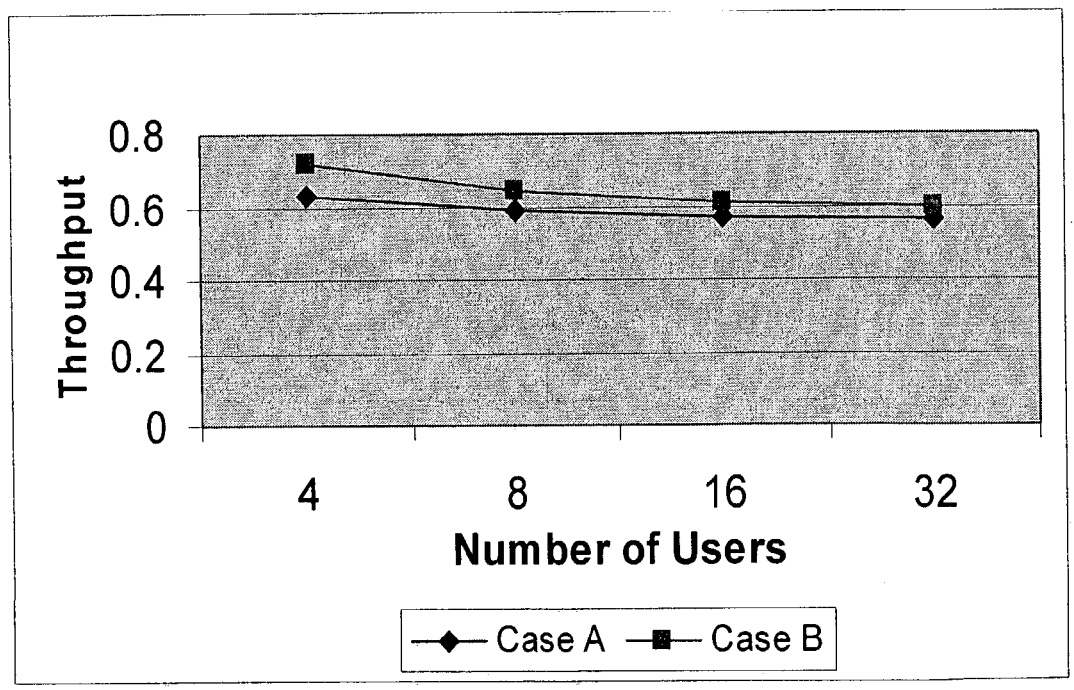
FIG. 8 is a graph showing throughput with correct and incorrect transmission probability, in accordance with an exemplary embodiment of the invention.

The throughputs for Case A where N=4, 8, 16, and 32, and for Case B where (N,M)=(2,2), (4,4), (8,8), and (16,16) are shown in FIG. 8. Despite the fact that half of the users in Case B use the incorrect transmission probability, the throughput k(B) for Case B is comparable to that of Case A for a wide range of values for N. Consequently, this example shows that the invention is robust against errors in the control parameter N.

E. Queuing Delay Analysis

The queuing behavior of examples of the invention will now be analyzed. The goal of the analysis is to compare the packet queuing delays at a user operating in accordance with examples of the invention, with those at a user operating under Dedicated Access, when packets are generated according to a Poisson process. To simplify the analysis, it is assumed that the invention operates with only the static component. Since in this analysis the invention operates without the dynamic component, whose main function is to reduce queuing delays, the analysis shows only the worst-case performance of the invention. The parameters and assumptions for the analysis are as follows:

T=the number of time slots in a TDMA frame; the number of users.

N=the number of user that are allowed to share each time slot in a TDMA frame under the invention.

At each user, packets are generated according to a Poisson process with a mean of $\lambda$ packets per T time slots.

Under Dedicated Access, each user is dedicated one time slot in each TDMA frame.

Under the examples of the invention, each user shares N time slots that are evenly spaced throughout each TDMA frame and each transmits with probability 1/N during its eligible time slots.

Figure 9:
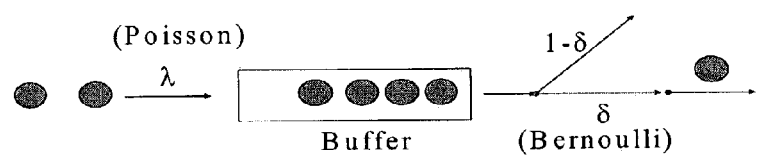
FIG. 9 is an illustration of a queuing model.

The queuing model of the queuing that may exist at each user is illustrated in FIG. 9. In this model packets are generated according to a Poisson process with a mean of $\lambda$ packets per time unit. During each time unit, the output channel is available for transmitting one packet with probability $\delta$ and is unavailable with probability 1-$\delta$ (that is, according to the Bernoulli process). The condition $\delta > \lambda$ is assumed so that the steady-state queue length distribution exists. The queuing discipline is first-in-first-out and the buffer size is infinite. The model corresponds with queuing behavior of Dedicated Access if the time unit is interpreted to be T time slots, and $\delta=1$, and the model corresponds with the queuing behavior of the invention if the time unit is interpreted to be 1 time slot, and $\delta=1/N$.

The performance measures of interest are as follows:

$E(T_{DA})$=the expected queuing delay of a packet for a user operating under Dedicated Access, that is, the time between when the packet is generated and when its first bit is transmitted onto the channel.

$E(T_{SHUMA})$=the expected queuing delay of a packet for a user operating under the invention.

To facilitate the presentation of analysis, the following variables are defined:

$L_j$=the number of packets in the queue at the end of the jth time unit.

$A_{j+1}$=the number of packets generated during the (j+1)th time unit.

$T_{j+1}$=the number of packets transmitted during the (j+1)th time unit if the queue is nonempty at the beginning of the time slot.

$I\{L_j \geq 1\}$=the indicator function of the event $\{L_j \geq 1\}$; that is, $$I(L_j \geq 1) = \begin{cases} 1 & L_j \geq 1 \\ 0 & L_j = 0 \end{cases}$$

A=the number of packets generated during a randomly selected time unit far away from the time origin.

L=the number of packets in the queue at the end of a randomly selected time unit far from the time origin.

T=the number of packets transmitted during a randomly selected time unit far from the time origin.

$I = \lim_{j \to \infty} I(L_j \geq 1)$ $P_k$=the equilibrium probability that there are k packets at the end of a randomly selected time unit far from the time origin; that is, $$P_k = Pr(L=k) = \lim_{j \to \infty} Pr(L_j=k) \quad k=0,1,2,$$

Since the packets are generated according to the Poisson process at rate $\lambda$ and the availability of the channel is subject to the Bernoulli process with parameter $\delta$, the distribution of $A_{j+1}$ and $T_{j+1}$ are as follows:

$$Pr(A_{j+1} = k) = \frac{\lambda^k e^{-\lambda}}{k!} \quad k = 0, 1, 2, \ldots$$

-continued $$T_{j+1} = \begin{cases} 1 & \delta \\ 0 & 1-\delta \end{cases}$$

The queue length $L_j$ evolves according to the following equation:

$$L_{j+1} = L_j - T_{j+1}I(L_j \geq 1) + A_{j+1}$$

The generation function of the probability distribution of L satisfies the following equations:

$$G_L(z) \equiv \sum_{j=0}^{\infty} Pr(L=j)z^j$$

$$G_L(Z) = G_{L-TI+A}(Z) = G_{L-TI}(z)G_A(z)$$

$$G_L(z) = E(z^{L-TI})e^{-\lambda(1-z)}$$

The generation function of (L−TI), $E(z^{L-TI})$, can be determined as follows:

$$E(z^{L-TI}) = E(P_0 z^0 + P_1 z^{1-T} + P_2 z^{2-T} + \ldots)$$

$$E(z^{L-TI}) = P_0 + \delta P_1 z^{1-1} + (1-\delta)P_1 z^{1-0} +$$

$$E(z^{L-TI}) = P_0 + \sum_{i=1}^{\infty} P_i z^{(i-0)}(1-\delta) + \sum_{i=1}^{\infty} P_i z^{(i-1)}(\delta)$$

$$E(z^{L-TI}) = P_0 + (1-\delta)(G_L(z) - P_0) + \frac{\delta}{z}(G_L(z) - P_0)$$

The generation function $G_L(z)$ is as follows:

$$G_L(z) = \left(P_0 + (1-\delta)(G_L(z) - P_0) + \frac{\delta}{z}(G_L(z) - P_0)\right)e^{-\lambda(1-z)}$$

The unknown parameter $P_0$, the probability that the queue is empty at the end of a time slot, is simply $1-\lambda/\delta$, the probability that the channel is not idle during a time slot. Substituting $P_0$ by $(\delta-\lambda)/\delta$, the following expression is obtained for $G_L(z)$:

$$G_L(z) = \frac{e^{-\lambda(1-z)}(\delta-\lambda)(z-1)}{[z - e^{-\lambda(1-z)}(z - \delta z + \delta)]}$$

The expected queue length $E(L)$ can be obtained from the generation function $G_L(z)$ as follows:

$$E(L) = G'_L(z)|_{z \to 1}$$

Applying L'Hopital's Rule twice, $$E(L) = \frac{\lambda(2-\lambda)}{2(\delta-\lambda)}$$

By Little's result, $\lambda E(T) = E(L)$, and the expected queuing delay $E(T)$ is as follows:

$$E(T) = \frac{\lambda(2-\lambda)}{2(\delta-\lambda)} \frac{1}{\lambda} = \frac{2-\lambda}{2(\delta-\lambda)}$$

Reinterpreting the time unit to be T time slots or 1 TDMA and setting $\delta=1$, the expected queuing delay $E(T_{DA})$ can be computed under Dedicated Access as follows:

$$E(T_{DA}) = \frac{2-\lambda}{2(1-\lambda)}T$$

Reinterpreting the time unit to be T/N slots and the arrival rate to be $\lambda/N$, and setting $\delta$ to be $1/N$, the expected queuing delay $E(T_{SHUMA})$ can be as follows:

$$E(T_{SHUMA}) = \frac{2 - \frac{\lambda}{N}}{2\left(\frac{1}{N} - \frac{\lambda}{N}\right)} \frac{T}{N} = \frac{2 - \frac{\lambda}{N}}{2(1-\lambda)}T$$

Since it is assumed that this example of the invention operates without its dynamic component in the analysis, $E(T_{SHUMA})$ is a worst-case estimate of the expected queuing time of the invention under the Poisson process. $\delta(N,\lambda)$ is defined to be the ratio of $E(T_{SHUMA})$ and $E(T_{DA})$; it follows that $$\varepsilon(N,\lambda) = \frac{E(T_{RA})}{E(T_{DA})} = \frac{2}{2-\lambda} - \frac{1}{N}\frac{\lambda}{2-\lambda}$$

Because $\epsilon(N,\lambda)$ is a nondecreasing function of N, $$\varepsilon(N,\lambda) \leq \lim_{N \to \infty} \left[\frac{2}{2-\lambda} - \frac{1}{N}\frac{\lambda}{2-\lambda}\right] = \frac{2}{2-\lambda}$$

Furthermore, because $\epsilon(N,\lambda)$ is a nondecreasing function of $\lambda$ and $\lambda < 1$, $$\varepsilon(N,\lambda) \leq \lim_{\lambda \to 1^-} \left[\frac{2}{2-\lambda} - \frac{1}{N}\frac{\lambda}{2-\lambda}\right] = 2 - \frac{1}{N}$$

It can be concluded that $\epsilon(N,\lambda) \leq 2$ for all admissible values of N and $\lambda$. The worst-case expected queuing delay under the invention without the dynamic component is always within a factor of two from that under Dedicated Access when the packets are generated according to a Poisson process.

Figure 10:
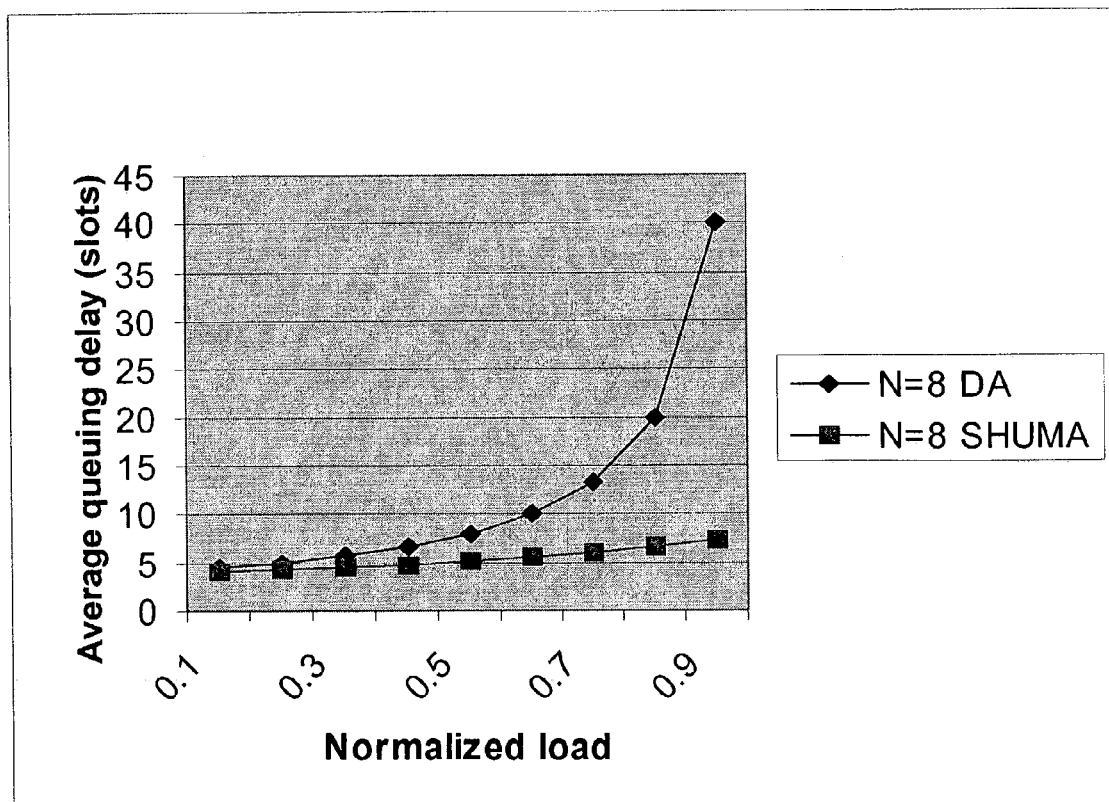
FIG. 10 is a graph of the queuing delay of an exemplary embodiment of the invention, and Dedicated Access.

FIG. 10 is graph of the results of a simulation of the mean queuing delays of an embodiment of the invention that includes the static and dynamic components, for various values of $\lambda$, compared with the mean queuing delays of Dedicated Access. In can be seen in FIG. 10 that the expected queuing delay resulted from the invention increases much less dramatically than that of Dedicated Access as the traffic load increases.

The queuing analysis was validated by comparing its results to the results obtained by simulation. The queuing analysis is based on a discrete-time queuing model in which the Poisson packet arrivals occur at time slot boundaries, that is, at the end of a time slot. The simulation, however, is based on a continuous-time model where the Poisson arrivals can occur at any time on the continuous time axis. The mean queuing delay of a discrete-time queuing model with Poisson arrivals is simply that of the corresponding continuous-time model plus half a time unit. The mean queuing delays for Dedicated Access and an embodiment of the invention (without the dynamic component) in the continuous-time model can be computed as follows:

$$E(T_{DA}) = \frac{2-\lambda}{2(1-\lambda)}T - \frac{1}{2}T$$

$$E(T_{SHUMA}) = \frac{2-\frac{\lambda}{N}}{2\left(\frac{1}{N} - \frac{\lambda}{N}\right)}\frac{T}{N} - \frac{1}{2}\frac{T}{N} = \frac{2-\frac{\lambda}{N}}{2(1-\lambda)}T - \frac{1}{2}\frac{T}{N}$$

The case where N=8, T=8, that is, 8 users sharing an 8-slot TDMA frame, and λ ranges from 0.1 to 0.9 at 0.1 increments were considered. The mean queuing delays effected by Dedicated Access and the invention without the dynamic component (sometimes referred to as SHUMA-S [S stands for "static component only"]) were obtained by analysis and by simulation. The results are shown in Table 3. The average relative difference between the simulation and analysis results for Dedicated Access is 0.2615%; and for the static embodiment of the invention, 0.6562%. The close agreement validates the correctness of both the analysis and the simulation.

TABLE 3

Validation of Dedicated Access and an embodiment of the invention queuing analyses

| λ | N = 8, T = 8 Mean queuing delay (analysis) | Mean queuing delay (simulation) | Difference (%) |
|---|---|---|---|
| | Dedicated Access | | |
| 0.1 | 4.4444 | 4.4267 | 0.399 |
| 0.2 | 5.0000 | 4.9874 | 0.252 |
| 0.3 | 5.7143 | 5.6964 | 0.313 |
| 0.4 | 6.6667 | 6.6705 | 0.057 |
| 0.5 | 8.0000 | 7.9774 | 0.283 |
| 0.6 | 10.0000 | 9.9711 | 0.289 |
| 0.7 | 13.3333 | 13.3233 | 0.075 |
| 0.8 | 20.0000 | 19.9871 | 0.064 |
| 0.9 | 40.0000 | 40.2484 | 0.621 |
| | SHUMA-S | | |
| 0.1 | 8.5330 | 8.2987 | 2.745 |
| 0.2 | 9.3750 | 9.3707 | 0.046 |
| 0.3 | 10.7142 | 10.7085 | 0.054 |
| 0.4 | 12.5833 | 12.4881 | 0.754 |
| 0.5 | 15.0000 | 15.0250 | 0.160 |
| 0.6 | 18.8750 | 18.7044 | 0.900 |
| 0.7 | 25.0000 | 24.8208 | 0.720 |
| 0.8 | 37.5000 | 37.4964 | 0.010 |
| 0.9 | 75.0000 | 74.6113 | 0.518 |

F. Distribution of the Number of Transmitters During Non-idle Time Slots

Assuming again that all N users sharing the time slot are saturated, the percentage of nonidle time slots during which there are two or more transmitters is determined, that is, the relative frequency with which a transmission collides with others. The variable $Y_N$ is defined to be the number of transmitters during a nonidle time slot when there are N users statistically sharing the time slots using an embodiment of the invention, and the variable Y is defined to be $\lim_{\{N\to\infty\}} Y_N$. The probability distributions of $Y_N$ and Y are as follows:

$$Pr(Y_N = j) = \frac{\binom{N}{j}\left(\frac{1}{N}\right)^j\left(1-\frac{1}{N}\right)^{N-j}}{1-\left(1-\frac{1}{N}\right)^N} \quad j = 1, 2, \ldots, N$$

$$Pr(Y = j) = \frac{1}{j!}\frac{e^{-1}}{1-e^{-1}} \quad j = 1, 2, 3, \ldots$$

Note that $$Pr(Y = j) = \frac{1}{j}Pr(Y = j-1) \quad j = 2, 3, \ldots$$

The random variable Y has its modal value at 1, and its probability mass function decreases hyperexponentially as the number of transmitters increases. For example, when there are an infinite number of users sharing the channel, the probability that one user transmits during a nonidle time slot is 0.5819; the probability of two users transmitting is ½ of 0.5819, or 0.2909; the probability of three users transmitting is ⅓ of 0.2902, or 0.0969. Having an infinite number of saturated users statistically sharing the channel is one of worst cases imaginable, yet the invention can guarantee that at least 58% of the times the transmission of a user is free of interferences. In more than 87% of all nonidle time slots, only one or two users would transmit. The fact that the probability Pr(Y=j) decreases hyperexponentially as j increases indicates that excessive simultaneous transmissions are unlikely.

The distribution Pr(Y=j) for j=1 to 8 is tabulated in Table 4. To verify the theoretical distribution of Y, an approximation of Y was obtained by simulation using N=256. The simulation result is also shown in Table 4. The relative differences between the analysis and simulation results are within numerical and sampling noise levels. The comparatively large difference in the Pr(Y=8) case is expected because Y=8 is a stochastically rare event, e.g., on the order of $10^{-5}$, and the expected simulation noise is quite large unless the simulation run is prohibitively long. The case where N→∞ and each user is saturated is one of the worst cases possible, and consequently, Y gives insight into the worst-case behavior of the invention.

TABLE 4

Pr(Y = j) by analysis and by simulation

| Y | Analysis (∞) | Simulation (256) | Difference (%) |
|---|---|---|---|
| 1 | 0.581976706 | 0.58202200 | 0.007868 |
| 2 | 0.290988353 | 0.29137434 | 0.132471 |
| 3 | 0.096996117 | 0.09684727 | 0.153693 |
| 4 | 0.024249029 | 0.02416561 | 0.345197 |
| 5 | 0.004849805 | 0.00467609 | 3.714982 |
| 6 | 0.000808300 | 0.00078356 | 0.315751 |
| 7 | 0.000115471 | 0.00011374 | 1.522392 |
| 8 | 0.000014433 | 0.00001738 | 16.95083 |

G. Evaluation of Examples of the Invention, Dedicated Access, and Distributed Dynamic Reservation In this section the performance of an embodiment of the invention is compared with the performance of the dedicated access protocol and the performance of a dynamic reservation protocol. It is assumed that the dynamic reservation protocol operates under ideal conditions where all control messages required by the protocol are perfectly exchanged among the users. Because such ideal conditions cannot be achieved in the Link-16 environment, the simulation studies overestimate the performance of such a protocol. The intent is to see the best performance achievable by the dynamic reservation protocol class and to use it as a basis for assessing the efficacy of some embodiments of the invention.

The objective is to evaluate the performance of embodiments of the invention, Dedicated Access, and Dynamic Reservation when the following parameters change: Traffic loads—This refers to the rates at which messages are generated at each user. Number of users—The number of users is a critical parameter and may have a significant impact on the performance of a protocol.

A network such as Link-16 is a system of stochastic systems, and predicting how a network would perform within a small confidence interval is beyond the scope of the simulation. The objectives of the simulation are to understand how factors such as time-varying traffic loads and changing number of users affect the performance of the protocols and to assess the relative performance of these protocols when they are subject to stochastically identical conditions.

Figure 11:
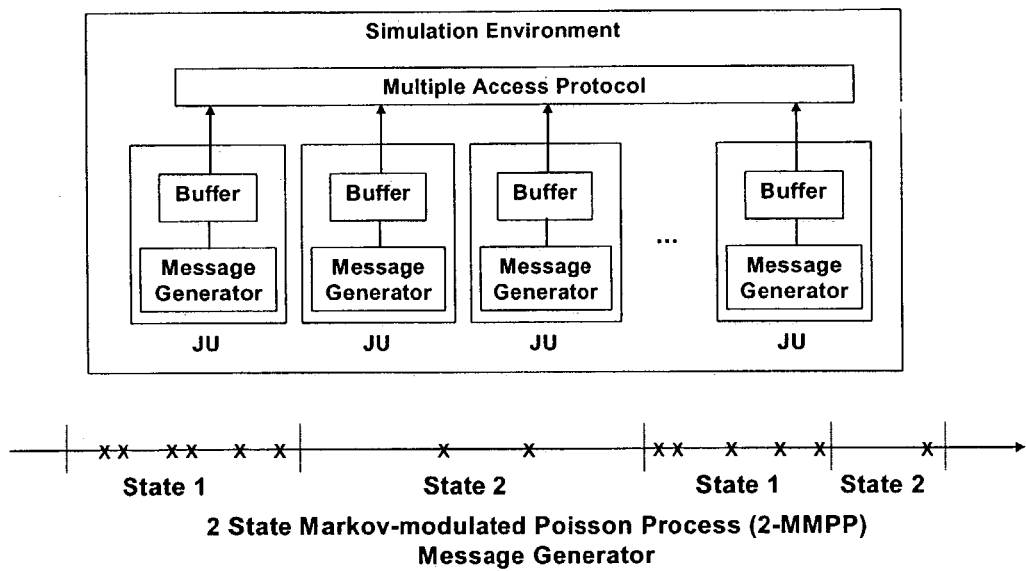
FIG. 11 is an illustration of a model of a message generator.

FIG. 11 illustrates a Link-16 terminal model. Messages are generated at each user according to the 2-state Markov-modulated Poisson process (2-MMPP). The messages are queued in a buffer and transmitted first-in-first-out onto the UHF channel as prescribed by the multiple access protocol.

Specifically, the message generation process and terminal queuing model are as follows:

Message generation process. There are N JUs $J_1, \ldots, J_N$. (JU is an abbreviation for Joint Tactical Information Distribution System Unit, [JTIDS Unit]). A JU $J_i$ generates messages according to a process that alternates between two states, $S_{i,1}$ and $S_{i,2}$. The periods of its staying in $S_{i,1}$ and $S_{i,2}$ are exponentially distributed with means $\mu_{i,1}$ and $\mu_{i,2}$, respectively. While in $S_{i,1}$, $J_i$ generates messages according to Poisson process at rate $\lambda_{i,1}$; and in $S_{i,2}$, at rate $\lambda_{i,2}$.

Statistical multiplexer. Messages generated at JU $J_i$ are queued in a buffer that can hold up to $B_i$ packets and are transmitted first-in-first-out onto the channel. Packets that cannot be accommodated into the buffer are discarded.

Figure 12:
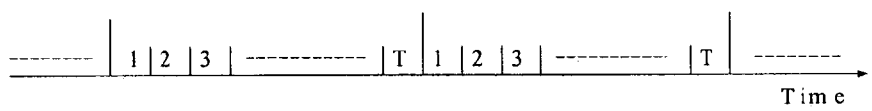
FIG. 12 is an illustration of T-slot TDMA Frames.

FIG. 12 is an illustration of T-slot TDMA Frames. As shown in FIG. 12, the time axis is divided into recurring frames each consisting of T time slots.

The input parameters of the simulation model are as follows:

T=the number of slots in a TDMA frame for an embodiment of the invention and Dedicated Access; also the number of time slots in a dynamic reservation request/transmission cycle.

N=the number of users (it is assumed that T is divisible by N)

$\mu_1$=the mean sojourn time in state $S_1$ of the 2-MMPP
$\mu_2$=the mean sojourn time in state $S_2$ of the 2-MMPP
$\lambda_1$=the mean number of messages generated per unit time while the 2-MMPP is in $S_1$
$\lambda_2$=the mean number of messages generated per unit time while the 2-MMPP is in $S_2$ K=the maximum number of messages that can be queued at a terminal The following assignments are made so that all the users are stochastically identical:

$B_i$=K
$\mu_{i,1}=\mu_1$
$\mu_{i,2}=\mu_2$
$\lambda_{i,1}=\lambda_1$
$\lambda_{i,2}=\lambda_2$ The normalized load p at a user is defined as $$\rho = \lambda_1 \frac{\mu_1}{\mu_1 + \mu_2} + \lambda_2 \frac{\mu_2}{\mu_1 + \mu_2}$$

The normalized load p at a user can also be defined as the mean number of messages generated by the user per T time slots divided by the quotient T/N. Each simulation run is 10,000,000 time slots.

Figure 13:
FIG. 13 is an illustration of a cycle with N users using Dedicated Access in accordance with the prior art.

The multiple access protocols are evaluated as follows:

Dedicated Access. Under Dedicated Access, if T is the number of time slots in a TDMA frame and N is the number of users (T is divisible by N), each user is allocated T/N time slots that are N time slots apart from each other. FIG. 13 is an illustration of Dedicated Access with N users.

Dynamic Reservation. In the evaluation of the dynamic reservation protocol, the following is assumed:

The channel is free of transmission errors and jamming.

Users are within line-of-sight of each other.

Figure 14:
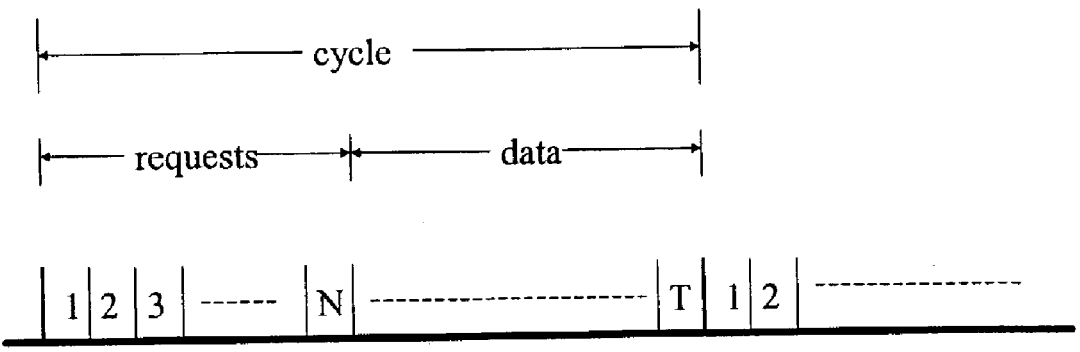
FIG. 14 is an illustration of a distributed Dynamic Reservation cycle in accordance with the prior art.

As shown in FIG. 14, the first N time slots of each TDMA frame are dedicated to the N users, which use them to broadcast their reservations to all others; the remaining T-N time slots of time frame are for transmissions of data messages.

Each user processes each received control message instantaneously.

When the total number of time slots requested by all users is fewer than (T−N) time slots, the excess time slots are allocated uniformly to the users. A user therefore can be granted more time slots that it has requested.

It is assumed that all users correctly receive all reservations sent, resulting in collision-free transmissions during the remaining T−N time slots of each frame.

If $R_i$ is the number of time slots that user i requested and $A_i$ is the number of time slots granted to user i by the protocol, then the allocation of the N users, $A_1, A_2, \ldots, A_N$, is determined according to the following algorithm:

Generate a random permutation π of the integers 1, ..., N.
V=T−N; /*total number of available time slots*/
$N_{max}=\lfloor 0.6V \rfloor$
For (j=1; N≧j; j++)
Begin
   M=π(j), where π(j) be the jth element of the permutation π
   $A_M$=min($R_M$,V);
   V=V−$A_M$;
End;
While (V>0)
   For (j=1; N≧j; j++)
   Begin
   M=π(j);

If (($A_M < N_{max}$) and (V>0))
  Begin
    $A_M = A_M + 1$;
    V=V−1;
  End;
End;

The $A_i$ time slots granted to user i are then uniformly distributed onto the last (T−N) time slots of the cycle.

Stochastic Unified Multiple Access. Some examples of the invention allow the number $N_i$ of users sharing the ith time slot to be different from the number $N_j$ of users sharing the jth time slot, where $N_i$ and $N_j$ can each range from 1 to N, the total number of users in the network. If all N users are allowed to statistically share each time slot, preplanning can be eliminated. To simplify the evaluation, $N_i$ is restricted such that $N_i$=N for all $1 \leq i \leq T$; that is, each time slot in a T-slot TDMA frame is shared by N users, as shown in FIG. 15.

The following performance measures are collected:

Mean message queuing delay at $J_i$. Let $n_i$ be the number of packets transmitted by JU $J_i$ and $d_{i,j}$ be the time when the jth packet generated at $J_i$ and when the packet is transmitted by JU $J_i$. The mean queuing delay $d_{i,mean}$ is collected and is defined as follows:

$$d_{i,mean} = \frac{1}{n_i}\sum_{j=1}^{n_i} d_{i,j}$$

Figure 16B:
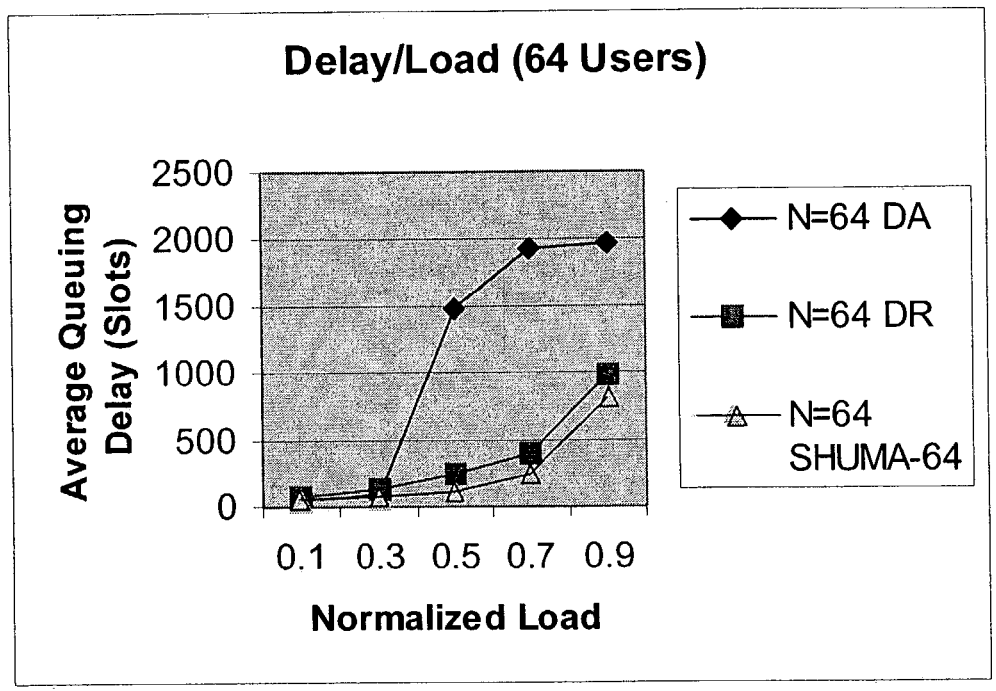
Figure 16C:
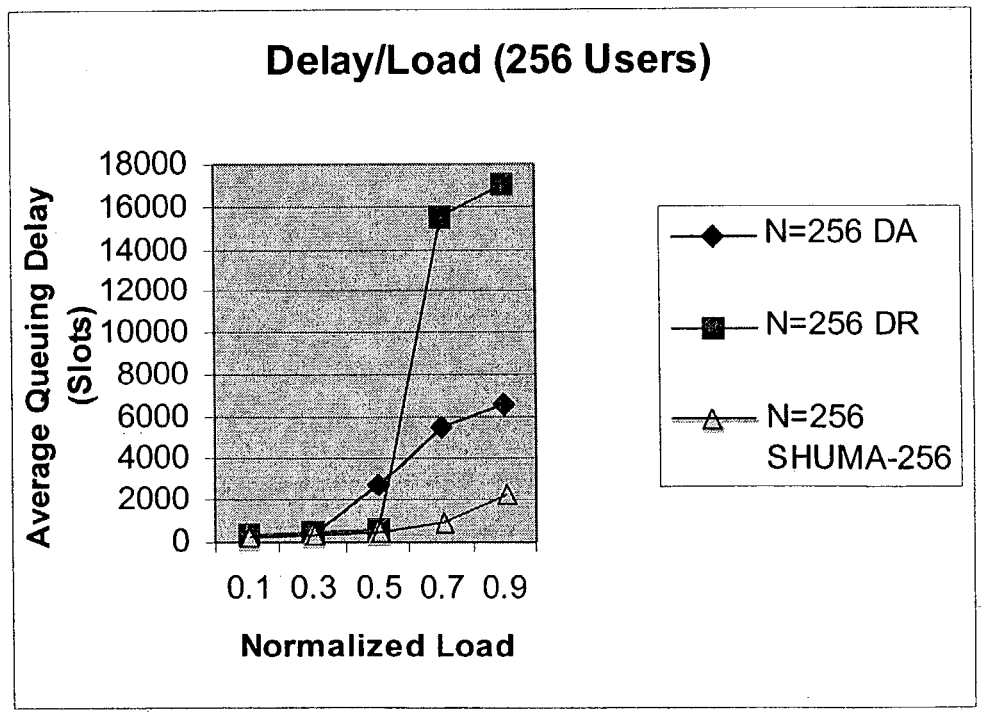

In the simulation T was fixed such that T=512, and N was varied (N=16, 64, 256). For a given N, the parameters $\mu_1$, $\mu_2$, $\lambda_1$, and $\lambda_2$ of the 2-MMPP were varied so that the normalized load p ranged from 0.1 T/N to 0.9 T/N in 0.1 T/N increments, and that $\mu_2 = 10\mu_1$ and $\lambda_1 = 10\lambda_2$. That is, at state two the traffic rate is ten times that at state one. The average message queuing delays effected by the three protocols when N=16, 64, and 256 are shown in FIGS. 16A-C. In each case, the invention yielded the shortest average queuing delay. The advantage of the invention over the other protocols is particularly dramatic when N=256 and illustrates the scalability of the invention.

Distribution of the number of transmitters. Let $X_j$ be the number of time slots during which there were j transmitters for $0 \leq j \leq N$ and $N_T$ be the total number of time slots elapsed. The (N+1)-tuple $(x_0, x_1, x_2, \ldots, x_N)$ is collected, where $x_j = X_j/N_T$ for $0 \leq j \leq N$. The relative frequency $f_j$ with which a transmission collides with (j−1) other transmissions for $j \geq 1$ is tabulated as follows:

$$f_j = \begin{cases} \dfrac{x_j}{1-x_0} & x_0 < 1 \\ 0 & x_0 = 1 \end{cases}$$

Because the advantage of the invention is in part achieved by risking simultaneous transmissions, it is important to quantify the frequencies with which simultaneous transmissions occur, even though the deleterious effects of simultaneous transmissions are naturally mitigated by the capture phenomenon, by the best-effort Link-16 paradigm, and by the fact that the transmitters may be beyond line of sight from each other. Note that unless dedicated access is used, simultaneous transmissions are unavoidable if dynamic entries and exits are allowed, and if the transmission medium is not perfect and subject to line-of-sight limitations. Furthermore, because of capture and the line-of-sight communication used in some applications, simultaneous transmissions are often beneficial; for example, the transmissions by two users separated by more than two line-of-sight hops pose no interferences to each other and constitute spatial reuse of the channel.

Figure 17:
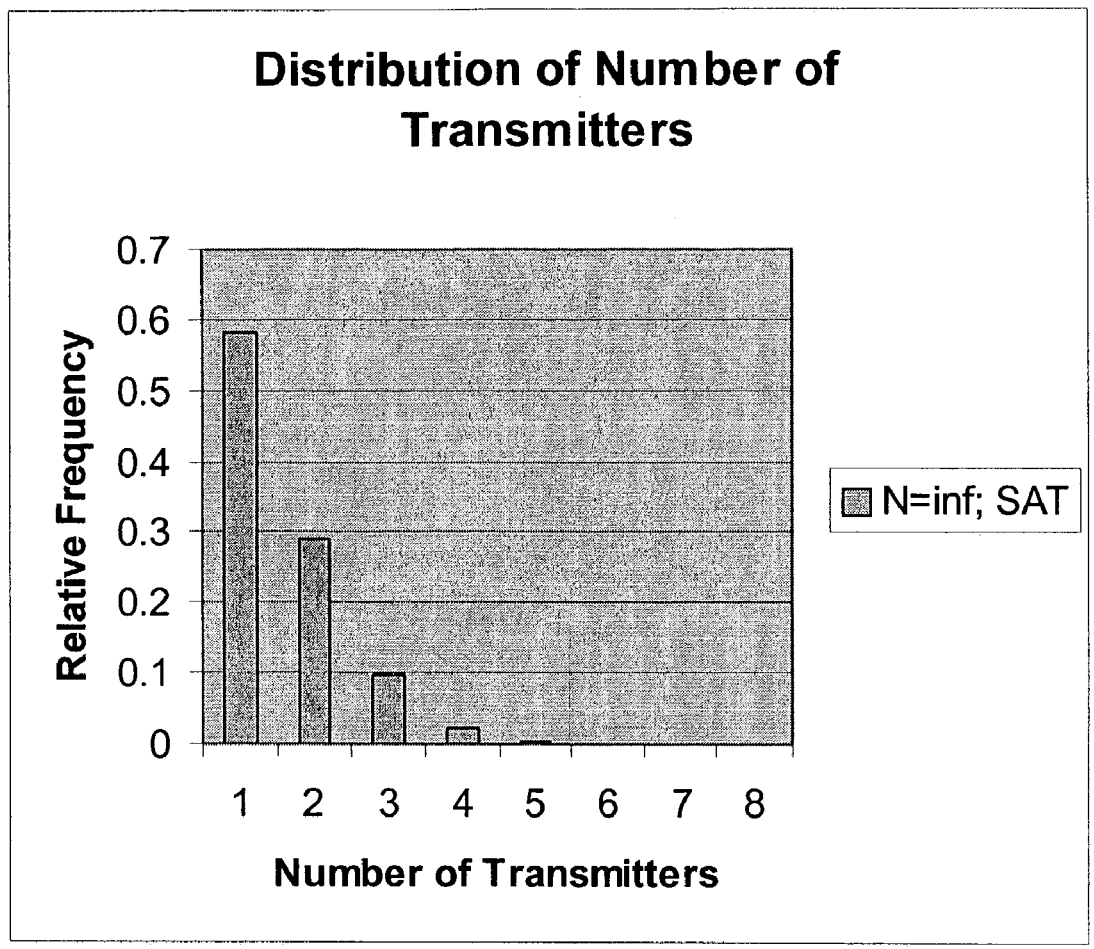
FIG. 17 is a graph of the distribution of the number of transmitters when N is infinite and the load factor is saturated, in accordance with an exemplary embodiment of the invention.
Figure 18A:
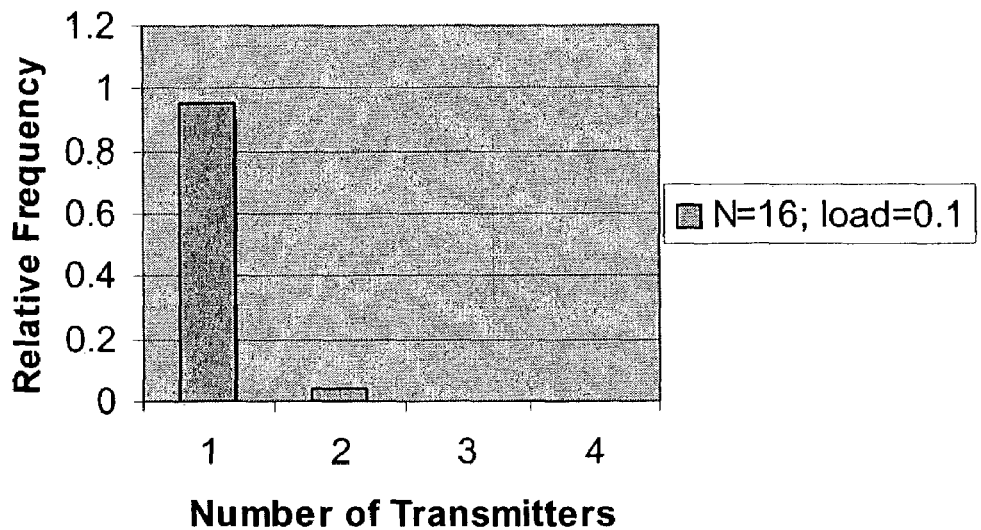
FIGS. 18A-E are graphs of the number of transmitters when N=16, for different load factors, in accordance with an exemplary embodiment of the invention.
Figure 18B:
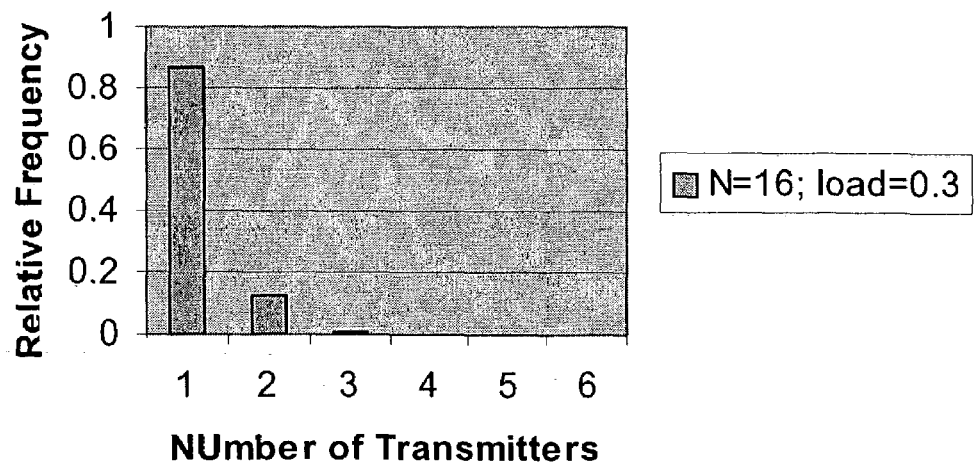
Figure 18C:
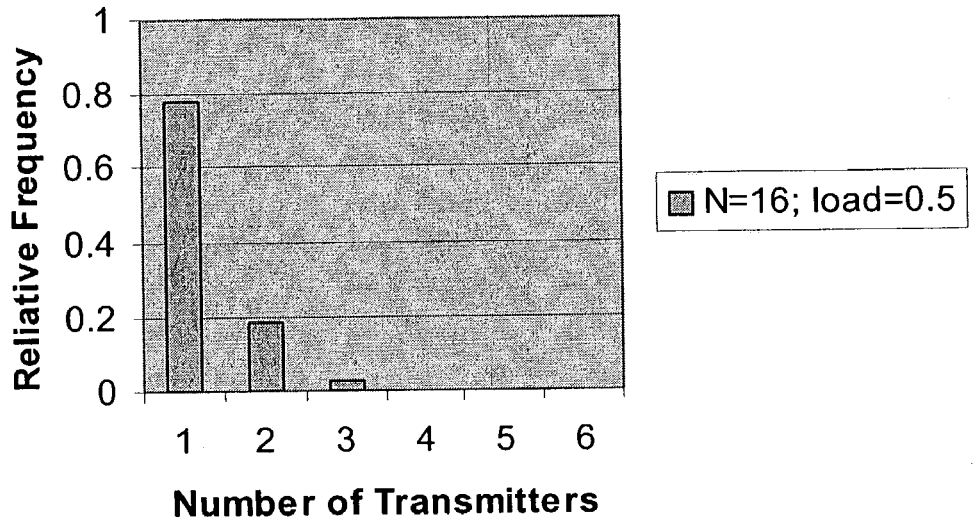
Figure 18D:
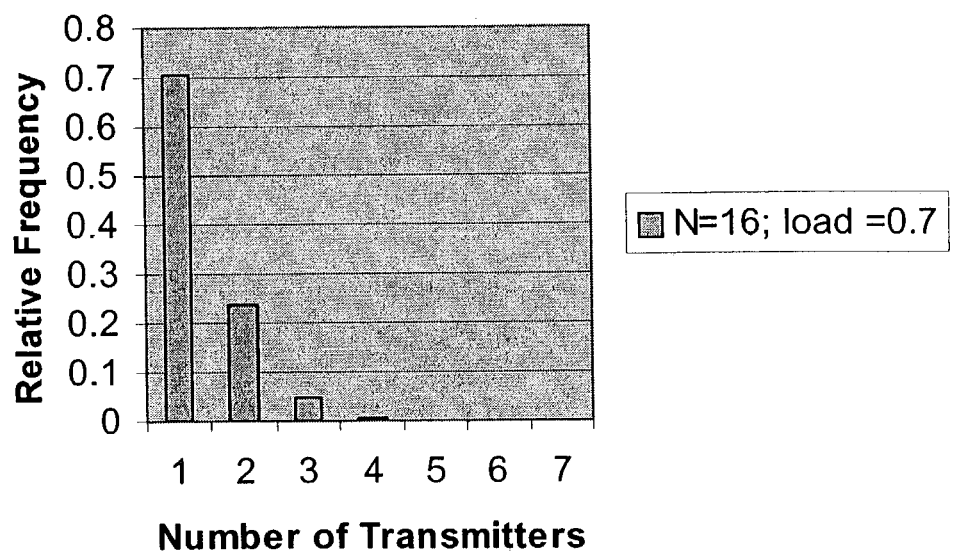
Figure 18E:
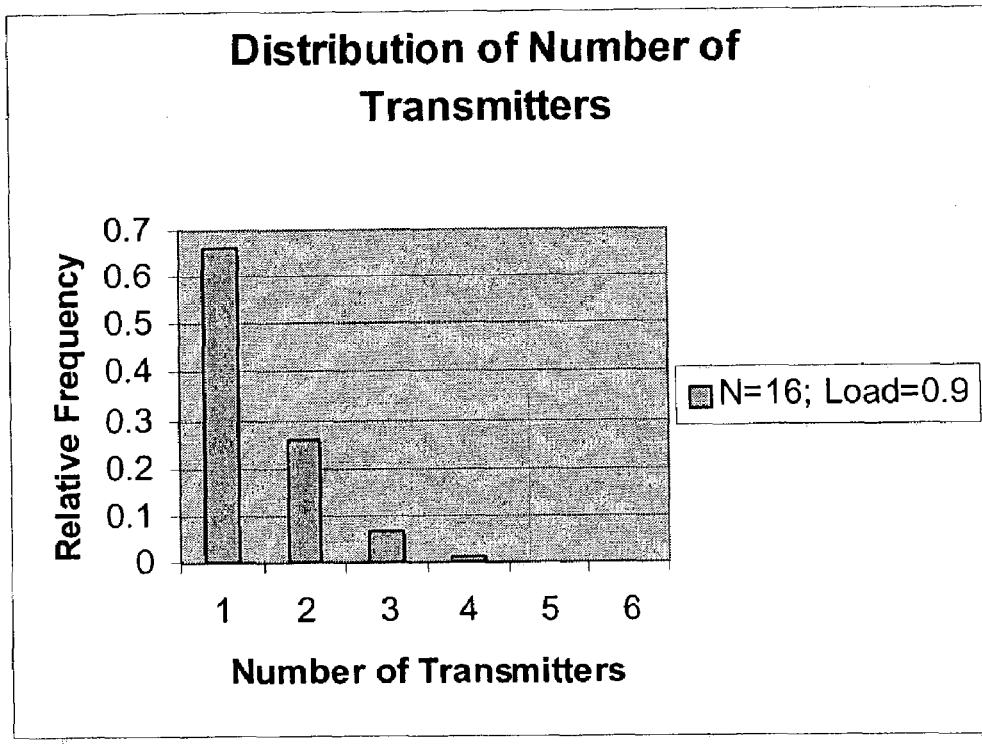
Figure 19A:
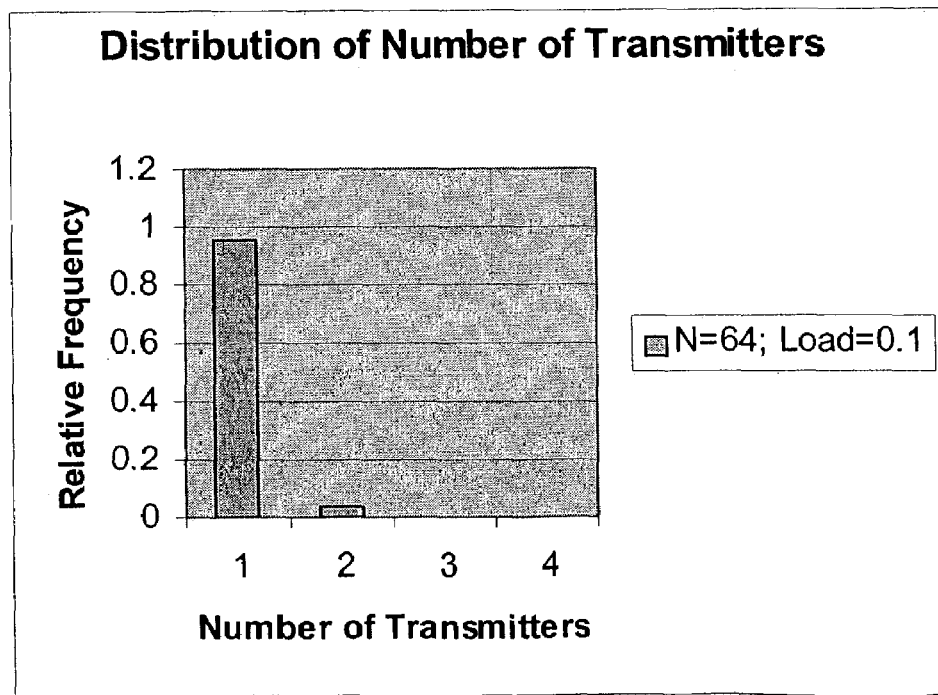
FIGS. 19A-E are graphs of the number of transmitters when N=64, for different load factors, in accordance with an exemplary embodiment of the invention.
Figure 19B:
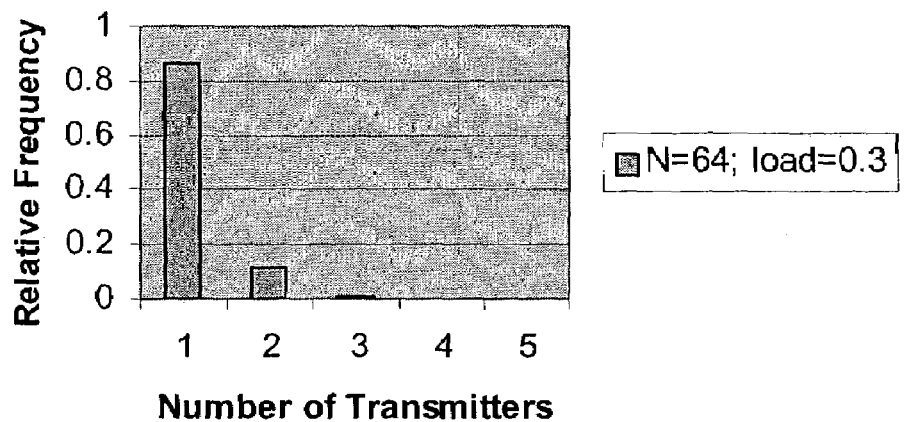
Figure 19C:
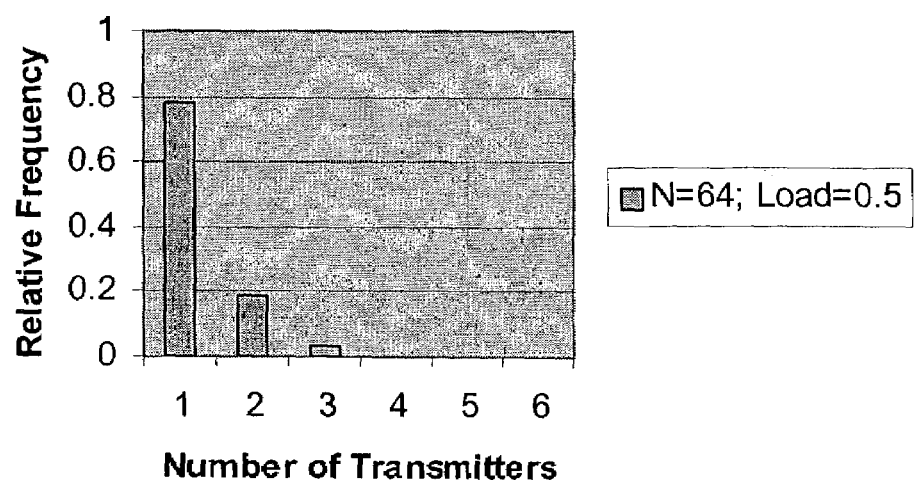
Figure 19D:
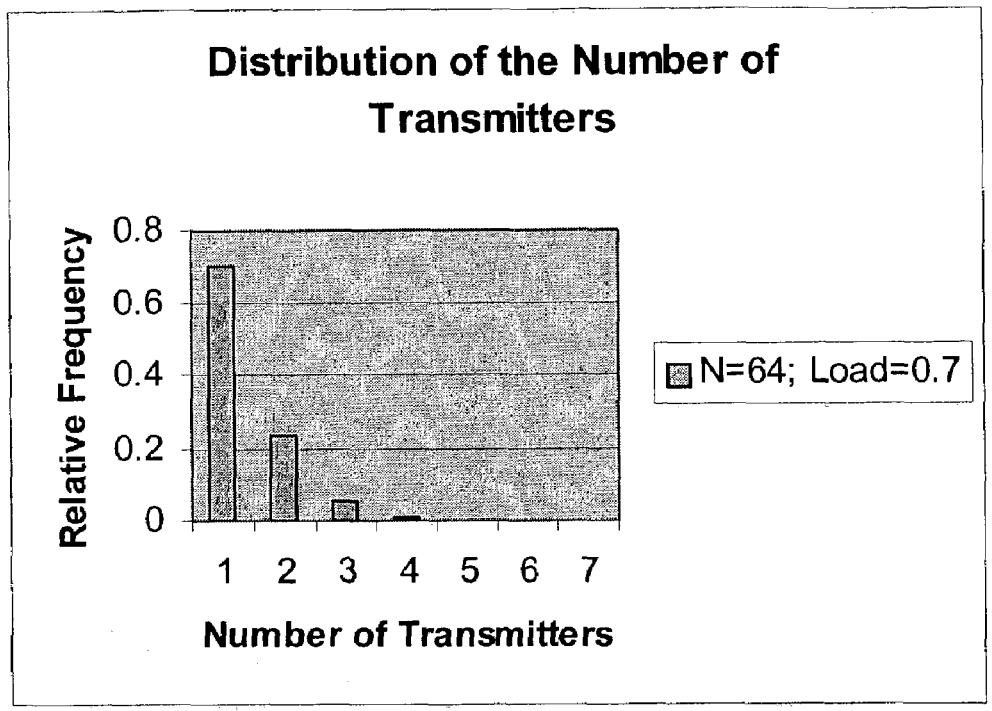
Figure 19E:
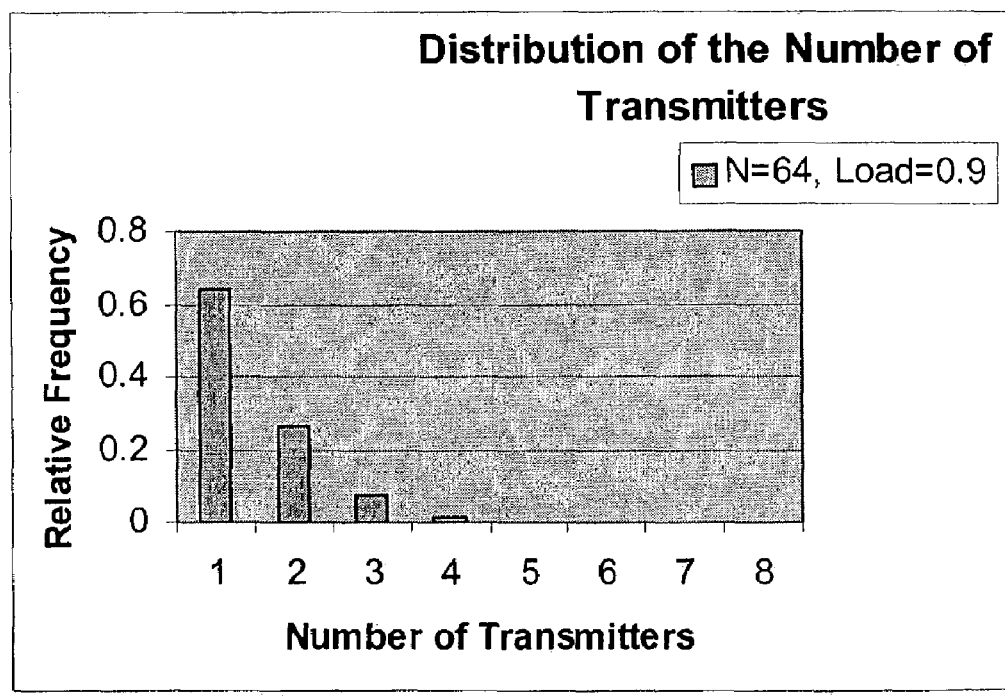
Figure 20A:
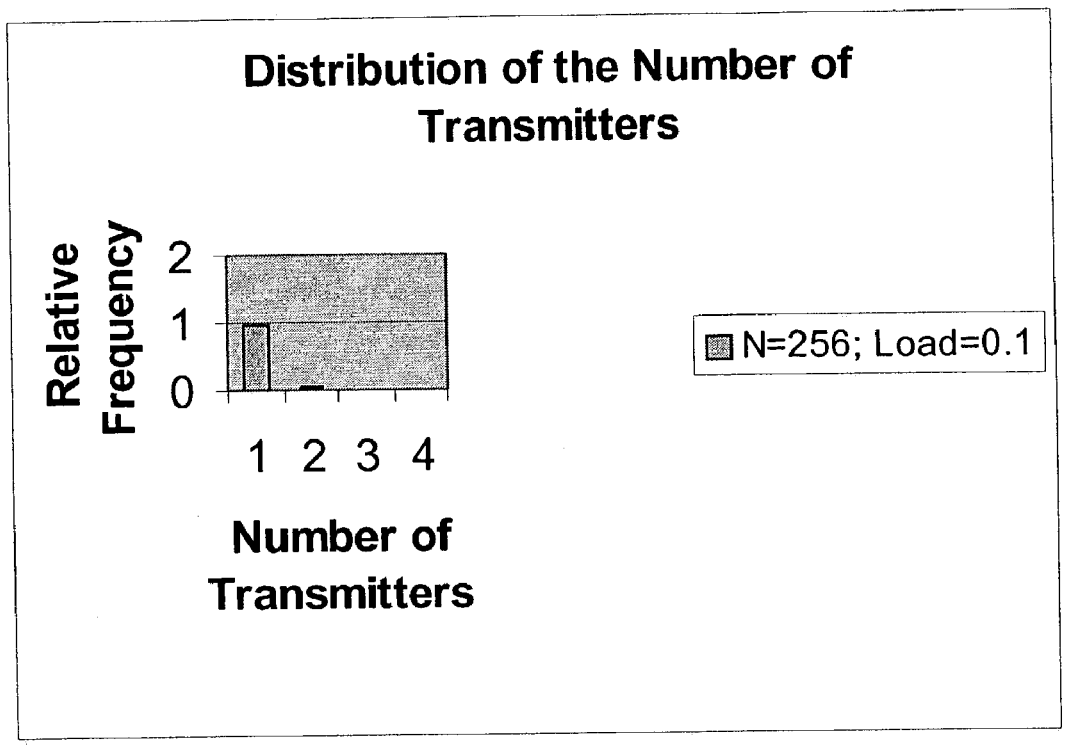
FIGS. 20A-E are graphs of the number of transmitters when N=256, for different load factors, in accordance with an exemplary embodiment of the invention.
Figure 20B:
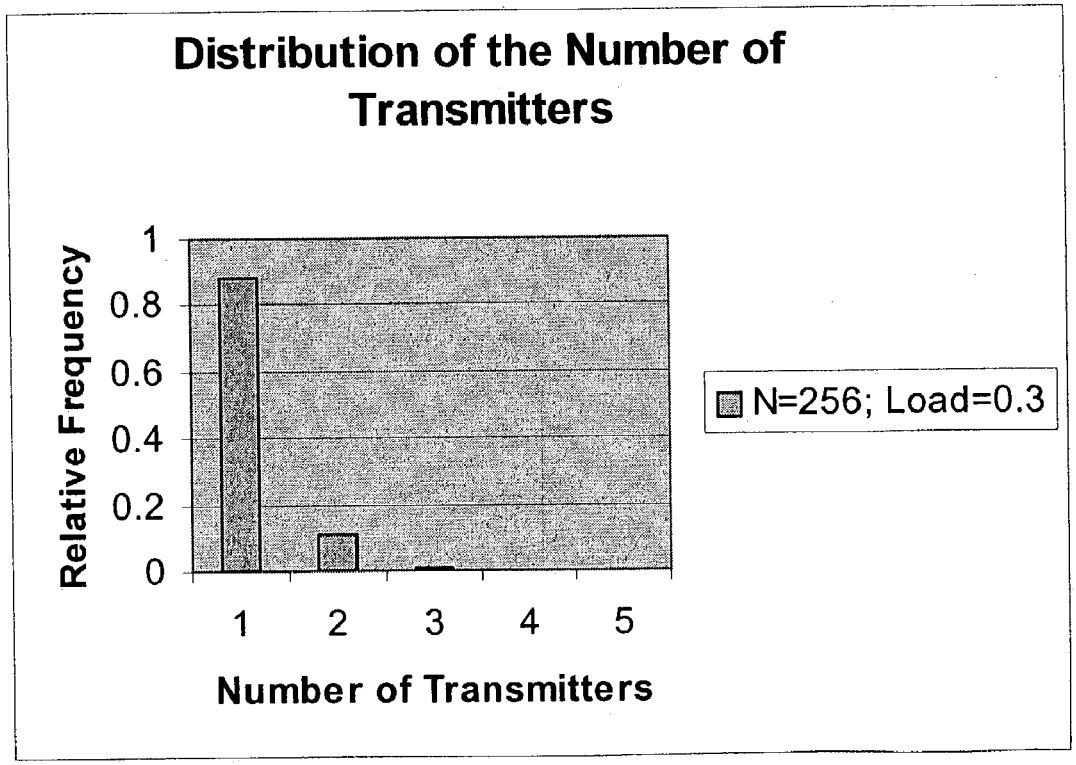
Figure 20C:
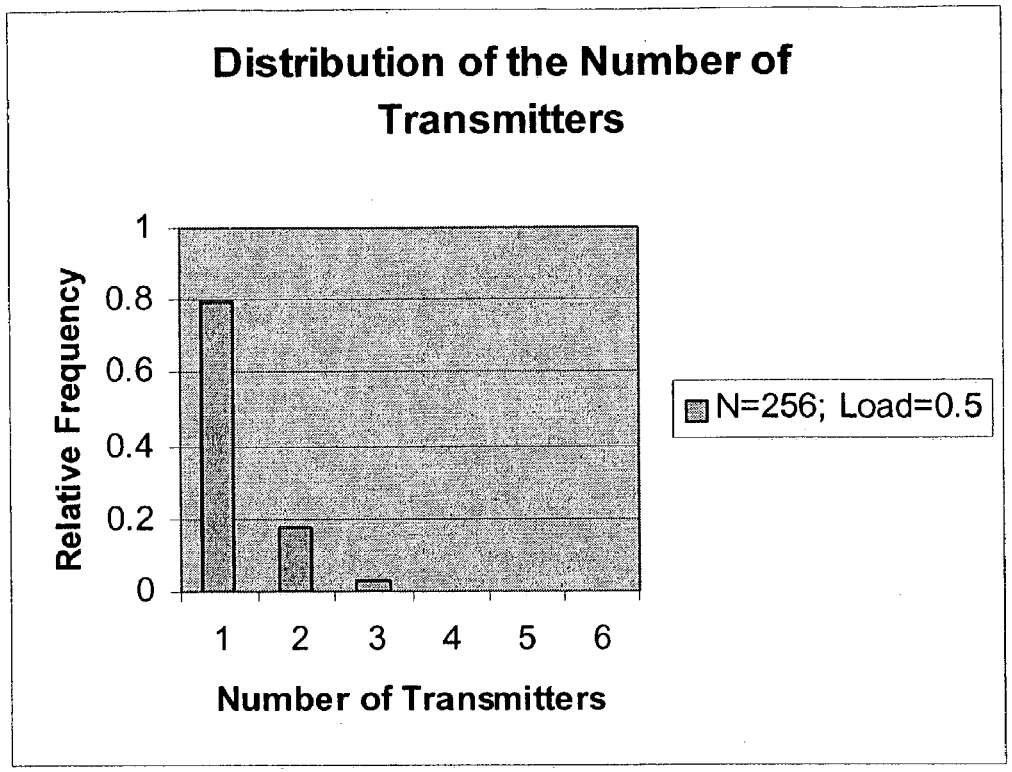
Figure 20D:
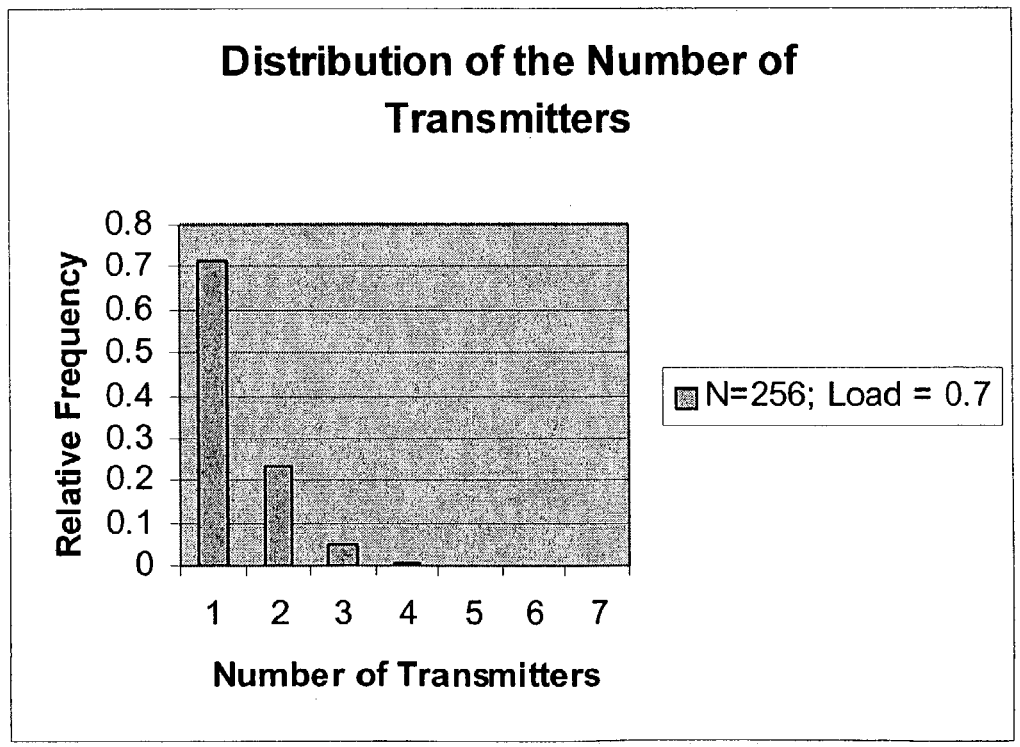
Figure 20E:
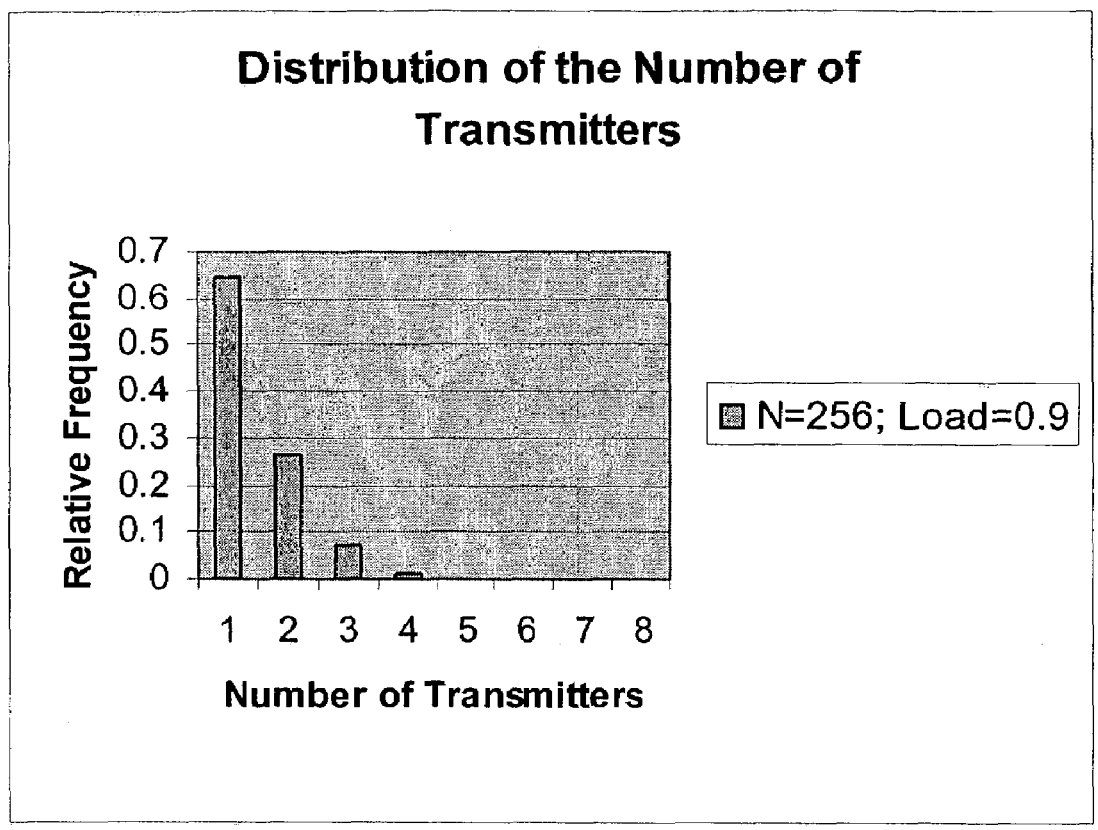

FIG. 17 is a graph of the distribution of the number of transmitters when N is infinite and the load factor is saturated. FIGS. 18A-E are graphs of the number of transmitters when N=16, for different load factors. FIGS. 19A-E are graphs of the number of transmitters when N=64, for different load factors. FIGS. 20A-E are graphs of the number of transmitters when N=256, for different load factors. The scalability of the invention and its ability to limit excessive simultaneous transmissions even under heavy traffic conditions and in a large user environment is evident in the case where N=256 and ρ=0.9. In about 65% of the non-idle cases, a transmission is free of interference. In another 25% of the cases, a transmission is interfered by only one other transmitter.

Message Delays. The average message delays of Dedicated Access, Dynamic Reservation, and the invention are about 7000, 17000, and 2000 time slots, respectively. These delays for Dedicated Access and Dynamic Reservation are excessive for tactical applications. In contrast, the invention has significantly reduced message latencies, and can support tactical applications.

VII. PROBABILITY THAT A UNIT WILL RECEIVE A TRANSMITTED MESSAGE

This section discusses the conditional probability that a Unit i will receive a message, when a protocol in accordance with an example of the invention is used. The Unit i sees $N_i$ units, but only $\alpha_i N_i$ units are within LOS of the Unit i. Also, only a portion of the $\alpha_i N_i$ units, for example, $\beta_i$ of them, have messages to transmit during a randomly selected time slot. In this example, $\alpha i$ roughly corresponds to topology, and $\beta i$ corresponds with the traffic load. The conditional probability that Unit i will receive a message transmitted by the farthest unit within the line of sight is given by the equation:

$$Pr(N_i, \alpha_i, \beta_i) = (1-1/N_i)^{\wedge}(\alpha_i \beta_i N - 1)$$

and, $$Pr(\infty, \alpha_i, \beta_i) = \exp(-\alpha_i \beta_i)$$

FIGS. 21A-C are a chart showing the conditional probability that Unit i will receive a message transmitted by the farthest unit in the $N_i$ units, for different values of $\alpha_i$ and $\beta_i$.

VIII. OTHER EMBODIMENTS

It will be understood that many additional changes in the details, materials, steps and arrangement of parts, which have been herein described and illustrated to explain the nature of the invention, may be made by those skilled in the art within the principle and scope of the invention as expressed in the appended claims. Furthermore, although elements of the invention may be described or claimed in the singular, the plural is contemplated unless limitation to the singular is explicitly stated.

What is claimed is:

1. A machine-readable medium tangibly embodying a program of machine-readable instructions executable by a digital processing apparatus to perform a method for determining whether to transmit a signal during a time slot, the method comprising the following operations:

detecting transmissions from a first group of users, wherein the transmissions are detected by a first designated user;

determining a first count of the number of users in the first group of users;
setting the value of a variable $N_{1,1}$ equal to one plus the first count;
determining whether the first designated user has data to transmit during a first time slot;
and if it is determined that the first designated user has data to transmit during the first time slot:
generating a first random number;
calculating $1/N_{1,1}$;
determining if the first random number is less than $1/N_{1,1}$;
and if it is determined that the first random number is less than $1/N_{1,1}$, transmitting a first time slot signal from the first designated user during the first time slot.

2. The machine-bearing medium of claim 1, wherein if it is determined that the first random number is not less than $N_{1,1}$, then the operations further comprise:
determining whether the value of the variable $B_{1,1}$ is greater than zero;
and if the value of $B_{1,1}$ is greater than zero:
generating a second random number;
determining whether the second random number is less than $1-(1-1/N_{1,1})^{B_{1,1}}$ and if so:
transmitting the first time slot signal from the first designated user during the first time slot; and
subtracting one from the value of $B_{1,1}$.

3. The machine-readable medium of claim 2, wherein if it is determined that the first designated user does not have data to transmit during the first time slot, then the operations further comprise:
determining if $B_{1,1}$ is less than the value of a prescribed variable K, and if so:
generating a third random number;
determining if the third random number is less than $1/N_{1,1}$, and if so:
adding one to the value of $B_{1,1}$.

4. The machine-readable medium of claim 2, wherein the operations further comprise transmitting at least one user identifier message.

5. The machine-readable medium of claim 3, wherein the operation of setting the variable $B_{1,1}$ to an initial value comprises setting the variable $B_{1,1}$ equal to zero.

6. The machine-readable medium of claim 3, wherein the transmissions from users that are detected by the first designated user are PPLI transmissions.

7. The machine-readable medium of claim 3, wherein only transmissions from users that are within two hops from the first designated user are detected by the first designated user.

8. The machine-readable medium of claim 3, wherein only transmissions from users that are within one hop from the first designated user are detected by the first designated user, and wherein the detected transmissions do not include PPLI transmissions.

9. The machine-readable medium of claim 3, wherein the first count of the number of users is determined by counting all users' transmissions that are detected by the first designated user.

10. The machine-readable medium of claim 3, wherein the first count of the number of users is determined by counting a subset of users' transmissions that are detected by the first designated user.

11. The machine-readable medium of claim 1, wherein the operations further comprise allocating a plurality of time slots per frame to the first designated user, and wherein the first designated user does not transmit any signals during time slots that are not allocated to the first designated user.

12. The machine-readable medium of claim 3, wherein the operations further comprise allocating a plurality of time slots per frame to each user in a network participation group, and wherein each user in the network participation group does not transmit any signals during time slots that are not allocated to the respective user.

13. The machine-readable medium of claim 3, wherein the transmissions are detected on a broadcast channel.

14. The machine-readable medium of claim 3, wherein the transmissions are detected on a Link-16 broadcast channel.

15. The machine-readable medium of claim 3, wherein the transmissions include non-voice data.

16. The machine-readable medium of claim 3, wherein the operations further comprise assigning a value to the variable K.

17. The machine-readable medium of claim 3, wherein the transmissions from the first group of users are detected by the first designated user during a first prescribed time period, and wherein the operations further comprise:
detecting transmissions from a second group of users during a second prescribed time period, wherein the transmissions from the second group of users are detected by the first designated user;
determining a second count of the number of users in the second group of users;
setting the value of a variable $N_{2,1}$, equal to one plus the second count;
determining whether the first designated user has data to transmit during a second time slot;
and if it is determined that the first designated user has data to transmit during the second time slot:
generating a fourth random number;
calculating $1/N_{2,1}$;
determining if the fourth random number is less than $1/N_{2,1}$;
and if it is determined that the fourth random number is less than $1/N_{2,1}$, transmitting a second time slot signal from the first designated user during the second time slot:
and if it is determined that the fourth random number is not less than $1/N_{2,1}$, determining whether the value of a variable $B_{2,1}$ is greater than zero;
and if the value of $B_{2,1}$ is greater than zero:
generating a fifth random number;
determining whether the fifth random number is less than $1-(1-1/N_{2,1})^{B_{2,1}}$; and if so:
transmitting the second time slot signal from the first designated user during the second time slot; and
subtracting one from the value of $B_{2,1}$;
and if it is determined that the first designated user does not have data to transmit during the second time slot:
determining if $B_{2,1}$ is less than K, and if so:
generating a sixth random number;
determining if the sixth random number is less than $1/N_{2,1}$, and if so:
adding one to the value of $B_{2,1}$.

18. The machine-readable medium of claim 17, wherein the first group of users and the second group of users are the same users.

19. The machine-readable medium of claim 17, wherein the first group of users and the second group of users are not identical sets of users.

20. The machine-readable medium of claim 3, wherein the transmissions from the first group of users are detected by the first designated user during a first prescribed time period, and wherein the operations further comprise:

detecting transmissions from a second group of users during a second prescribed time period, wherein the transmissions from the second group of users are detected by a second designated user;

determining a second count of the number of users in the second group of users;

setting the value of a variable $N_{1,2}$ equal to one plus the second count;

determining whether the second designated user has data to transmit during the first time slot;

and fit is determined that the second designated user has data to transmit during the first time slot:

generating a fourth random number;

calculating $1/N_{1,2}$;

determining if the fourth random number is less than $1/N_{1,2}$;

and if it is determined that the fourth random number is less than $1/N_{1,2}$, transmitting a second designated user signal from the second designated user during the first time slot;

and if it is determined that the fourth random number is not less than $N_{1,2}$ determining whether the value of a variable $B_{1,2}$ is greater than zero;

and if the value of $B_{1,2}$ is greater than zero:

generating a fifth random number;

determining whether the fifth random number is less than $1-(1-1/N_{1,2})^{B_{1,2}}$, and if so:

transmitting the second designated user signal from the second designated user during the first time slot; and subtracting one from the value of $B_{1,2}$;

and if it is determined that the second designated user does not have data to transmit during the first time slot:

determining if $B_{1,2}$ is less than K, and if so:

generating a sixth random number;

determining if the sixth random number is less than $1/N_{1,2}$, and if so:

adding one to the value of $B_{1,2}$.

21. The machine-readable medium of claim 20, wherein the first group of users and the second group of users are the same users.

22. The machine-readable medium of claim 20, wherein the first group of users and the second group of users are not identical sets of users.

23. The machine-readable medium of claim 20, wherein the first prescribed time period is the same as the second prescribed time period.

24. A method for determining whether to transmit a signal during a time slot, the method comprising the following operations:

detecting transmissions from a first group of users, wherein the transmissions are detected by a first designated user;

determining a first count of the number of users in the first group of users;

setting the value of a variable N equal to one plus the first count;

determining whether the first designated user has data to transmit during a first time slot;

and if it is determined that the first designated user has data to transmit during the first time slot:

generating a first random number;

calculating 1/N;

determining if the first random number is less than 1/N;

and if it is determined that the first random number is less than 1/N, transmitting a first time slot signal from the first designated user during the first time slot.

25. The method of claim 24, wherein the first count of the number of users is determined by counting all users' transmissions that are detected by the first designated user.

26. The method of claim 24, wherein the first count of the number of users is determined by counting a subset of users' transmissions that are detected by the first designated user.

27. The method of claim 24, wherein if it is determined that the first random number is not less than N, then the operations further comprise:

determining whether the value of a variable B is greater than zero;

and if the value of the variable B is greater than zero:

generating a second random number;

determining whether the second random number is less than $1-(1-1/N)^B$, and if so:

transmitting the first time slot signal from the first designated user during the first time slot.

28. The method of claim 27, wherein if it is determined that the first designated user does not have data to transmit during the first time slot, then the operations further comprise:

assigning a value to a variable K;

determining if the variable B is less than K, and if so:

generating a third random number;

determining if the third random number is less than 1/N, and if so:

adding one to the value of the variable B.

29. A transceiver system, comprising:

a receiver;

a transmitter;

a memory; and a processor coupled to the receiver, the transmitter, and the memory, wherein the processor is programmed to perform operations for determining whether to transmit a signal during a time slot, wherein the operations comprise:

detecting transmissions from a first group of users, wherein the transmissions are detected by a first designated user;

determining a first count of the number of users in the first group of users;

setting the value of a variable $N_{1,1}$ equal to one plus the first count;

determining whether the first designated user has data to transmit during a first time slot;

and if it is determined that the first designated user has data to transmit during the first time slot:

generating a first random number;

calculating $1/N_{1,1}$;

determining if the first random number is less than $1/N_{1,1}$;

and if it is determined that the first random number is less than $1/N_{1,1}$, transmitting a first time slot signal from the first designated user during the first time slot.

30. The transceiver system of claim 29, wherein if it is determined the first random number is not less than $N_{1,1}$, then the operations further comprise:

determining whether the value of a variable $B_{1,1}$ is greater than zero;

and if the value of the variable $B_{1,1}$ is greater than zero:
    generating a second random number; and
    determining whether the second random number is less than $1-(1-1/N_{1,1})^{B_{1,1}}$ and if so:
        transmitting the first time slot signal from the first designated user during the first time slot; and
        subtracting one from the value of the variable $B_{1,1}$.

31. The transceiver system of claim 30, wherein if it is determined that the first designated user does not have data to transmit during the first time slot, then the operations further comprise:

determining if the variable $B_{1,1}$ is less than the value of a prescribed variable K, and if so:
    generating a third random number;
    determining if the third random number is less than $1/N_{1,1}$, and if so:
        adding one to the value of $B_{1,1}$.

32. The transceiver system of claim 29, further comprising an aircraft attached to the transmitter.

* * * * *